United States Patent
Ma et al.

(10) Patent No.: US 10,745,533 B2
(45) Date of Patent: Aug. 18, 2020

(54) FOAMED THERMOPLASTIC MATERIAL, METHOD FOR THE MANUFACTURE THEREOF, ARTICLES PREPARED THEREFROM, AND ARTICLE-FORMING METHOD

(71) Applicant: SABIC GLOBAL TECHNOLOGIES B.V., Bergen op Zoom (NL)

(72) Inventors: Shuailei Ma, Evansville, IN (US); Kapil Chandrakant Sheth, Mt. Vernon, IN (US); Ji Zhou, Shanghai (CN); Jian Yang, Shanghai (CN); Raghavendra Raj Maddikeri, Mt. Vernon, IN (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 66 days.

(21) Appl. No.: 16/317,660

(22) PCT Filed: Jul. 5, 2017

(86) PCT No.: PCT/US2017/040698
§ 371 (c)(1),
(2) Date: Jan. 14, 2019

(87) PCT Pub. No.: WO2018/013388
PCT Pub. Date: Jan. 18, 2018

(65) Prior Publication Data
US 2019/0218356 A1    Jul. 18, 2019

Related U.S. Application Data

(60) Provisional application No. 62/362,715, filed on Jul. 15, 2016.

(51) Int. Cl.
*C08J 9/08* (2006.01)
*C08J 9/00* (2006.01)
(Continued)

(52) U.S. Cl.
CPC . *C08J 9/08* (2013.01); *C08J 9/00* (2013.01); *C08J 9/009* (2013.01); *C08J 9/0014* (2013.01);
(Continued)

(58) Field of Classification Search
None
See application file for complete search history.

(56) References Cited

U.S. PATENT DOCUMENTS

| 5,024,506 A | 6/1991 | Hardin et al. |
| 5,202,946 A | 4/1993 | Hardin et al. |

(Continued)

FOREIGN PATENT DOCUMENTS

| WO | 2006065540 A1 | 6/2006 |
| WO | 2009138241 | 11/2009 |

(Continued)

OTHER PUBLICATIONS

International Search Report for International Application No. PCT/US20171040698; International Filing Date Jul. 5, 2017; dated Aug. 22, 2017; 6 pages.

(Continued)

*Primary Examiner* — Shawn Mckinnon
(74) *Attorney, Agent, or Firm* — Cantor Colburn LLP

(57) ABSTRACT

A foamed thermoplastic material includes a thermoplastic material exhibiting, in its unfoamed state, a particular flammability index, flame growth rate, and specific extinction area. The foamed thermoplastic material further includes a plurality of cells having a number average mean diameter of 5 to 150 micrometers present in an amount effective to provide the foamed thermoplastic material with a density that is 10 to 90 percent of the density of the unfoamed thermoplastic material. The foamed thermoplastic material exhibits a desirable tensile elongation and dielectric con- (Continued)

stant. A process for forming the foamed thermoplastic material, articles including the foamed thermoplastic material, and an article-forming process are also described.

14 Claims, 1 Drawing Sheet

(51) Int. Cl.
    *C08L 71/12*    (2006.01)
    *C08L 83/12*    (2006.01)
    *H01B 3/30*     (2006.01)
    *H01B 3/44*     (2006.01)
    *H01B 7/295*   (2006.01)
    *H01B 13/00*   (2006.01)
    *H01B 3/42*     (2006.01)

(52) U.S. Cl.
    CPC .......... *C08J 9/0023* (2013.01); *C08J 9/0028* (2013.01); *C08J 9/0038* (2013.01); *C08J 9/0061* (2013.01); *C08J 9/0066* (2013.01); *C08J 9/0095* (2013.01); *C08L 71/12* (2013.01); *C08L 83/12* (2013.01); *H01B 3/301* (2013.01); *H01B 3/427* (2013.01); *H01B 3/441* (2013.01); *H01B 7/295* (2013.01); *H01B 13/0016* (2013.01); *C08J 2201/024* (2013.01); *C08J 2201/03* (2013.01); *C08J 2203/02* (2013.01); *C08J 2205/044* (2013.01); *C08J 2205/052* (2013.01); *C08J 2207/06* (2013.01); *C08J 2371/12* (2013.01); *C08J 2381/06* (2013.01); *C08J 2383/12* (2013.01); *C08J 2409/06* (2013.01); *C08J 2419/00* (2013.01); *C08J 2423/08* (2013.01); *C08J 2423/12* (2013.01); *C08J 2423/16* (2013.01); *C08J 2423/20* (2013.01); *C08J 2423/22* (2013.01); *C08J 2423/30* (2013.01); *C08J 2453/00* (2013.01); *C08J 2453/02* (2013.01); *C08L 2201/02* (2013.01); *C08L 2203/14* (2013.01); *C08L 2203/202* (2013.01); *C08L 2205/025* (2013.01); *C08L 2205/035* (2013.01)

(56) References Cited

U.S. PATENT DOCUMENTS

| | | |
|---|---|---|
| 5,253,317 A | 10/1993 | Allen et al. |
| 6,015,510 A | 1/2000 | Jacobson et al. |
| 8,017,697 B2 | 9/2011 | Carrillo et al. |
| 8,669,332 B2 | 3/2014 | Carrillo et al. |
| 2014/0069687 A1 | 3/2014 | Tryson et al. |

FOREIGN PATENT DOCUMENTS

| | | |
|---|---|---|
| WO | 2014130751 | 8/2014 |
| WO | 2015097058 | 7/2015 |

OTHER PUBLICATIONS

Written Opinion of the International Searching Authority for International Application No. PCT/US2017/040698; International Filing Date Jul. 5, 2017; dated Aug. 22, 2017; 6 pages.

FOAMED THERMOPLASTIC MATERIAL, METHOD FOR THE MANUFACTURE THEREOF, ARTICLES PREPARED THEREFROM, AND ARTICLE-FORMING METHOD

CROSS-REFERENCE TO RELATED APPLICATIONS

This application is a National Stage application of PCT/US2017/040698, filed Jul. 5, 2017, which claims the benefit of U.S. Provisional Application No. 62/362,715 filed Jul. 15, 2016, both of which are incorporated by reference herein in their entirety.

BACKGROUND

Solid and foamed fluoropolymers (FP), such as fluorinated ethylene propylene (FEP), polyvinylidene fluoride (PVDF), ethylene chlorotrifluoroethylene (ECTFE), ethylene tetrafluoroethylene (ETFE), polytetrafluoroethylene (PTFE) and the like, are typically selected as the insulation materials for plenum cables despite suffering from significant technical limitations. Some materials fail to meet the rigorous fire safety test standards in accordance with the National Fire Protection Association standard NFPA 262 as outlined in NFPA 90A. Furthermore, use of fluoropolymers in communication cables is a subject of concern in many countries as they emit highly toxic and corrosive smoke during a fire event. In addition, fluoropolymers such as FEP exhibit undesired levels of corrosion to tool and die equipment during processing and thus require special care during wire extrusion. Thus, there are significant concerns over the potential toxicity of fluoropolymers to working environment or operators during cable production.

Accordingly, there remains a need in the art for a material that can overcome the above-described technical limitations. In particular, a material meeting all the electrical, mechanical, flame and smoke requirements for insulation (e.g., of plenum-rated cables) and that is more environmentally friendly (e.g., non-halogenated) is needed.

BRIEF SUMMARY

One embodiment is a foamed thermoplastic material comprising a thermoplastic material exhibiting, in its unfoamed state, a flammability index of 0.1 to 15, determined according to ASTM D7309 Method A at a heating rate of 1° C. per second under nitrogen from 25 to 750° C.; a flame growth rate of 0.1 to 1.5 kW/m$^2$s, determined according to ASTM E1354 or ISO 5660 using an applied heat flux of 35 kilowatt per square meter; a specific extinction area of 300 to 1200 square meters per kilogram, determined according to ASTM E1354 or ISO 5660 using an applied heat flux of 35 kilowatt per square meter; a tensile elongation of greater than 100%, measured according to UL 1581 at a temperature of 23° C., using a coated wire test sample; and a dielectric constant of 2 to 4, determined according to ASTM D150-11 at 1 MHz; and in its foamed state, a tensile elongation of 100 to 500%, measured according to UL 1581 at a temperature of 23° C., using a coated wire test sample; and a dielectric constant of 1.4 to 4, determined according to ASTM D150-11 at 1 MHz; and a plurality of cells having a number average mean diameter of 5 to 150 micrometers; wherein the cells are present in an amount effective to provide the foamed thermoplastic material with a density that is 10 to 90 percent of the density of the unfoamed thermoplastic material.

Another embodiment is a process of forming a foamed thermoplastic material, the process comprising, melt-kneading an unfoamed thermoplastic material exhibiting, a flammability index of 0.1 to 15, determined according to ASTM D7309 Method A at a heating rate of 1° C. per second under nitrogen from 25 to 750° C.; a flame growth rate of 0.1 to 1.5 kW/m$^2$s, determined according to ASTM E1354 or ISO 5660 using an applied heat flux of 35 kilowatt per square meter; a specific extinction area of 300 to 1200 square meters per kilogram, determined according to ASTM E1354 or ISO 5660 using an applied heat flux of 35 kilowatt per square meter; a tensile elongation of greater than 100%, measured according to UL 1581 at a temperature of 23° C., using a coated wire test sample; and a dielectric constant of 2 to 4, determined according to ASTM D150-11 at 1 MHz; and a carbon dioxide-generating blowing agent under conditions effective to provide a foamed thermoplastic material, wherein the foamed thermoplastic material comprises a plurality of cells having a number average mean diameter of 5 to 150 micrometers, wherein the cells are present in an amount effective to provide a foamed material with a density that is 10 to 90 percent of the density of the unfoamed thermoplastic material, wherein the foamed thermoplastic material exhibits a tensile elongation of 100 to 500%, measured according to UL 1581 at a temperature of 23° C., using a coated wire test sample; and a dielectric constant of 1.4 to 4, determined according to ASTM D150-11 at 1 MHz.

Another embodiment is a foamed thermoplastic material prepared by the above process.

Another embodiment is an article comprising the foamed thermoplastic material.

Another embodiment is a process of coating a conductor wire, the process comprising, preheating the conductor wire to a temperature of 150 to 220° C.; contacting the preheated conductor wire with an unfoamed thermoplastic material exhibiting, a flammability index of 0.1 to 15, determined according to ASTM D7309 Method A at a heating rate of 1° C. per second under nitrogen from 25 to 750° C.; a flame growth rate of 0.1 to 1.5 kW/m$^2$s, determined according to ASTM E1354 or ISO 5660 using an applied heat flux of 35 kilowatt per square meter; a specific extinction area of 300 to 1200 square meters per kilogram, determined according to ASTM E1354 or ISO 5660 using an applied heat flux of 35 kilowatt per square meter; a tensile elongation of greater than 100%, measured according to UL 1581 at a temperature of 23° C., using a coated wire test sample; and a dielectric constant of 2 to 4, determined according to ASTM D150-11 at 1 MHz; and a carbon dioxide-generating blowing agent under conditions effective to provide a foamed thermoplastic material substantially surrounding the conductor wire and having a plurality of cells having a number average mean diameter of 5 to 150 micrometers, wherein the cells are present in an amount effective to provide a foamed material with a density that is 10 to 90 percent of the density of the unfoamed thermoplastic material; and wherein the foamed thermoplastic material exhibits a tensile elongation of 100 to 500%, measured according to UL 1581 at a temperature of 23° C., using a coated wire test sample; and a dielectric constant of 1.4 to 4, determined according to ASTM D150-11 at 1 MHz.

These and other embodiments are described in detail below.

BRIEF DESCRIPTION OF THE DRAWINGS

The following Figures are exemplary embodiments.

DETAILED DESCRIPTION

Figure 1:
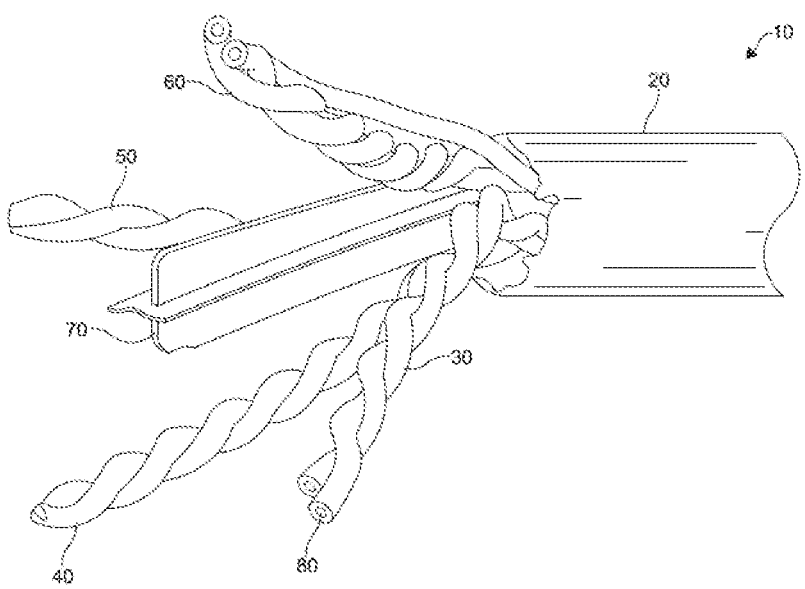
FIG. 1 is a schematic representation of a plenum cable.

The present inventors have discovered a foamed material that can advantageously provide a desirable combination of flame and smoke properties and mechanical properties. In particular, the present inventors have unexpectedly determined that selection of an unfoamed thermoplastic material exhibiting a specific combination of flammability index (FI), flame growth rate (FIGRA), and specific extinction area (SEA) can provide a foamed material having an advantageous tensile elongation and dielectric constant. The foamed thermoplastic materials described herein can be particularly useful for forming articles such as plenum cables, more specifically as foamed insulation for plenum cables.

Accordingly, one aspect of the present disclosure is a foamed thermoplastic material. The foamed thermoplastic material comprises a thermoplastic material that exhibits a particular flammability index, flame growth rate, and specific extinction area when in its unfoamed state. For example, the unfoamed thermoplastic material exhibits a flammability index (FI) of 0.1 to 15, determined according to ASTM D7309 Method A at a heating rate of 1° C. per second under nitrogen from 25 to 750° C., a flame growth rate (FIGRA) of 0.1 to 1.5 kilowatts per square meter·second (kW/m²s), determined according to ASTM E1354 or ISO 5660 using an applied heat flux of 35 kilowatt per square meter, and a specific extinction area (SEA) of 300 to 1200 m² per kilogram, determined according to ASTM E1354 or ISO 5660 using an applied heat flux of 35 kilowatt per square meter. In some embodiments, the thermoplastic material exhibits a FI of 1 to 15, or 3 to 15, or 5 to 14. In some embodiments, the thermoplastic material exhibits a FIGRA of 0.5 to 1.5, or 0.5 to 1.25, or 0.5 to 1.1 kW/m²s. In some embodiments, the thermoplastic material exhibits a SEA of 500 to 1200 m² per kilogram.

The unfoamed thermoplastic material also exhibits a particular tensile elongation at break and dielectric constant. For example, the unfoamed thermoplastic material exhibits a tensile elongation of greater than 100%, or 100 to 750%, or 100 to 500%, measured according to UL 1581 at a temperature of 23° C., using a coated wire test sample. The unfoamed thermoplastic material further exhibits a dielectric constant of 2 to 4, or 2.5 to 4, or 3 to 4, or 3 to 3.5, determined according to ASTM D150-11 at 1 MHz.

The foamed thermoplastic material further includes a plurality of cells having a number average mean diameter of 5 to 150 micrometers, specifically 5 to 50 micrometers. The number average mean diameter of the cells of the foam can be determined by analysis of average cell size determined using scanning electron microscopy (SEM). The cells, or voids, within the foamed thermoplastic material can be defined by the thermoplastic material. The cell structure of the foamed material is generally formed through the use of a blowing agent, which can be selected so as to provide a desired cell size, cell size distribution, or cell morphology. In some embodiments, the foamed thermoplastic material can have an open-cell or a closed-cell structure. In some embodiments, the foamed thermoplastic material is a closed-cell thermoplastic material. As used herein, the term "closed-cell" refers to a foamed material having cells, at least 95% of which are closed. The cells can be present in the foamed material in an amount effective to provide the foamed thermoplastic material with a density that is 10 to 90 percent, or 30 to 90 percent, or 45 to 85 percent of the density of the corresponding unfoamed thermoplastic material. In some embodiments, the foamed thermoplastic material can have a density of 0.3 to 3 grams per cubic centimeter (g/cm³), measured at 23° C.

In general, the thermoplastic material useful for forming the foamed thermoplastic materials described herein can be any thermoplastic material meeting the above-described FI, FIGRA, and SEA requirements for the unfoamed thermoplastic material. In some embodiments, the thermoplastic material is preferably non-halogenated or halogen-free (i.e., the thermoplastic material includes less than 1 weight percent, or less than 0.1 weight percent of a halogen). In some embodiments, the thermoplastic material is preferably non-fluorinated.

In some embodiments, the thermoplastic material comprises a thermoplastic polymer selected from the group consisting of a poly(phenylene ether), a polysulfone, and combinations thereof.

In some embodiments, the thermoplastic material comprises a poly(phenylene ether). Poly(phenylene ether)s includes those comprising repeating structural units having the formula

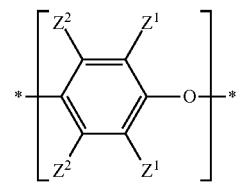

wherein each occurrence of $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each occurrence of $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms. As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as substituted, it may, optionally, contain heteroatoms over and above the carbon and hydrogen members of the substituent residue. Thus, when specifically described as substituted, the hydrocarbyl residue can also contain one or more carbonyl groups, amino groups, hydroxyl groups, or the like, or it can contain heteroatoms within the backbone of the hydrocarbyl residue. As one example, $Z^1$ can be a di-n-butylaminomethyl group formed by reaction of a terminal 3,5-dimethyl-1,4-phenyl group with the di-n-butylamine component of an oxidative polymerization catalyst.

The poly(phenylene ether) can comprise molecules having aminoalkyl-containing end group(s), typically located in a position ortho to the hydroxy group. Also frequently present are tetramethyldiphenoquinone (TMDQ) end groups, typically obtained from 2,6-dimethylphenol-containing reaction mixtures in which tetramethyldiphenoquinone by-product is present. The poly(phenylene ether) can be in the form of a homopolymer, a copolymer, a graft copolymer, an ionomer, or a block copolymer, as well as combinations thereof.

In some embodiments, the poly(phenylene ether) comprises a poly(phenylene ether-siloxane) block copolymer. As used herein, the term "poly(phenylene ether-siloxane) block copolymer" refers to a block copolymer comprising at least one poly(phenylene ether) block and at least one polysiloxane block.

In some embodiments, the poly(phenylene ether-siloxane) block copolymer is prepared by an oxidative copolymerization method. In this method, the poly(phenylene ether-siloxane) block copolymer is the product of a process comprising oxidatively copolymerizing a monomer mixture comprising a monohydric phenol and a hydroxyaryl-terminated polysiloxane. In some embodiments, the monomer mixture comprises 70 to 99 parts by weight of the monohydric phenol and 1 to 30 parts by weight of the hydroxyaryl-terminated polysiloxane, based on the total weight of the monohydric phenol and the hydroxyaryl-terminated polysiloxane. The hydroxyaryl-diterminated polysiloxane can comprise a plurality of repeating units having the structure

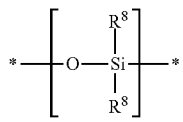

wherein each occurrence of $R^8$ is independently hydrogen, $C_1$-$C_{12}$ hydrocarbyl or $C_1$-$C_{12}$ halohydrocarbyl; and two terminal units having the structure

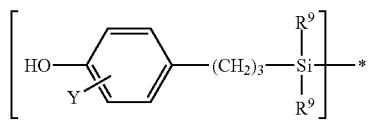

wherein Y is hydrogen, $C_1$-$C_{12}$ hydrocarbyl, $C_1$-$C_{12}$ hydrocarbyloxy, or halogen, and wherein each occurrence of $R^9$ is independently hydrogen, $C_1$-$C_{12}$ hydrocarbyl or $C_1$-$C_{12}$ halohydrocarbyl. In a very specific embodiment, each occurrence of $R^8$ and $R^9$ is methyl, and Y is methoxy.

In some embodiments, the monohydric phenol comprises 2,6-dimethylphenol, and the hydroxyaryl-terminated polysiloxane has the structure

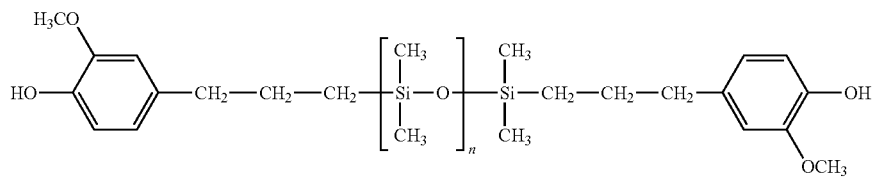

wherein n is, on average, 5 to 100, specifically 30 to 60.

The oxidative copolymerization method produces poly(phenylene ether-siloxane) block copolymer as the desired product and poly(phenylene ether) (without an incorporated polysiloxane block) as a by-product. It is not necessary to separate the poly(phenylene ether) from the poly(phenylene ether-siloxane) block copolymer. The poly(phenylene ether-siloxane) block copolymer can thus be utilized as a "reaction product" that includes both the poly(phenylene ether) and the poly(phenylene ether-siloxane) block copolymer. Certain isolation procedures, such as precipitation from isopropanol, make it possible to assure that the reaction product is essentially free of residual hydroxyaryl-terminated polysiloxane starting material. In other words, these isolation procedures assure that the polysiloxane content of the reaction product is essentially all in the form of poly(phenylene ether-siloxane) block copolymer. Detailed methods for forming poly(phenylene ether-siloxane) block copolymers are described in U.S. Pat. Nos. 8,017,697 and 8,669,332 to Carrillo et al.

In some embodiments, the poly(phenylene ether) has an intrinsic viscosity of 0.25 to 1 deciliter per gram measured by Ubbelohde viscometer at 25° C. in chloroform. Within this range, the poly(phenylene ether) intrinsic viscosity can be 0.3 to 0.65 deciliter per gram, specifically 0.3 to 0.6 deciliter per gram, more specifically 0.35 to 0.5 deciliter per gram, even more specifically 0.4 to 0.5 deciliter per gram.

In some embodiments, the poly(phenylene ether) comprises a homopolymer or copolymer of monomers selected from the group consisting of 2,6-dimethylphenol, 2,3,6-trimethylphenol, and combinations thereof. In some embodiments, the poly(phenylene ether) comprises a poly(phenylene ether-siloxane) block copolymer. In these embodiments, the poly(phenylene ether-siloxane) block copolymer can, for example, contribute 0.05 to 2 weight percent, specifically 0.1 to 1 weight percent, more specifically 0.2 to 0.8 weight percent, of siloxane groups to the composition as a whole.

In some embodiments, the thermoplastic material comprises a polysulfone. Polysulfones include those comprising repeating units including one or more sulfone linkages. In some embodiments, the polysulfone comprises repeating structural units having the formula

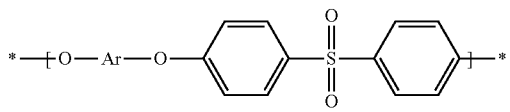

wherein Ar is independently at each occurrence a substituted or unsubstituted divalent organic group, for example a substituted or unsubstituted $C_{6-20}$ aromatic hydrocarbon group. In some embodiments, Ar is a divalent group of the formula

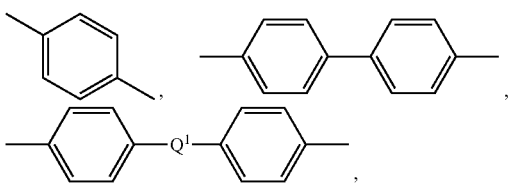

wherein $Q^1$ is —O—, —S—, —C(O)—, —SO$_2$—, —SO—, —C$_y$H$_{2y}$— wherein y is an integer from 1 to 5 or a halogenated derivative thereof (which includes perfluoroalkylene groups. In some embodiments, $Q^1$ is —O—, —SO$_2$—, or —C$_y$H$_{2y}$— wherein y is an integer from 1 to 5. In some embodiments, $Q^1$ is a 2,2-isopropylidene group (e.g., Ar is a group derived from bisphenol A).

Exemplary polysulfones can include those available under the trade name UDEL or RADEL-A, VERADEL, RADEL-R, and ACUDEL, each available from Solvay Specialty Polymers, LLC, and ULTRASON E2010, available from BASF.

A specific non-limiting example of a polysulfone is a polysulfone comprising repeating structural units having the formula

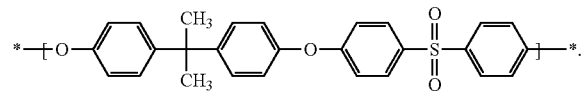

In some embodiments, the thermoplastic material can optionally further include one or more additives. The additives can be selected so as to not significantly adversely affect the desired properties of the thermoplastic material. For example, the thermoplastic material can, optionally, further comprise an additive chosen from stabilizers, mold release agents, lubricants, processing aids, drip retardants, nucleating agents, UV blockers, dyes, pigments, antioxidants, anti-static agents, blowing agents, mineral oil, metal deactivators, antiblocking agents, and combinations thereof. When present, such additives are typically used in a total amount of less than or equal to 15 parts by weight, or less than or equal to 10 parts by weight, or less than or equal to 5 parts by weight based on 100 parts by weight total of thermoplastic polymer, hydrogenated block copolymer, polyolefin, and flame retardant.

In some embodiments, the thermoplastic material can optionally further comprise a hydrogenated block copolymer of an alkenyl aromatic monomer and a conjugated diene. For brevity, this component is referred to as the "hydrogenated block copolymer". The hydrogenated block copolymer can comprise 10 to 90 weight percent of poly(alkenyl aromatic) content and 90 to 10 weight percent of hydrogenated poly(conjugated diene) content, based on the weight of the hydrogenated block copolymer. In some embodiments, the hydrogenated block copolymer is a low poly(alkenyl aromatic) content hydrogenated block copolymer in which the poly(alkenyl aromatic) content is 10 to less than 40 weight percent, specifically 20 to 35 weight percent, more specifically 25 to 35 weight percent, yet more specifically 30 to 35 weight percent, all based on the weight of the low poly(alkenyl aromatic) content hydrogenated block copolymer. In other embodiments, the hydrogenated block copolymer is a high poly(alkenyl aromatic content) hydrogenated block copolymer in which the poly(alkenyl aromatic) content is 40 to 90 weight percent, specifically 50 to 80 weight percent, more specifically 60 to 70 weight percent, all based on the weight of the high poly(alkenyl aromatic content) hydrogenated block copolymer.

In some embodiments, the hydrogenated block copolymer has a weight average molecular weight of 40,000 to 400,000 grams per mole. The number average molecular weight and the weight average molecular weight can be determined by gel permeation chromatography and based on comparison to polystyrene standards. In some embodiments, the hydrogenated block copolymer has a weight average molecular weight of 200,000 to 400,000 grams per mole, specifically 220,000 to 350,000 grams per mole. In other embodiments, the hydrogenated block copolymer has a weight average molecular weight of 40,000 to 200,000 grams per mole, specifically 40,000 to 180,000 grams per mole, more specifically 40,000 to 150,000 grams per mole.

The alkenyl aromatic monomer used to prepare the hydrogenated block copolymer can have the structure

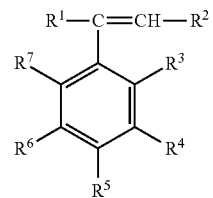

wherein $R^1$ and $R^2$ each independently represent a hydrogen atom, a $C_1$-$C_8$ alkyl group, or a $C_2$-$C_8$ alkenyl group; $R^3$ and $R^7$ each independently represent a hydrogen atom, a $C_1$-$C_8$ alkyl group, a chlorine atom, or a bromine atom; and $R^4$, $R^5$, and $R^6$ each independently represent a hydrogen atom, a $C_1$-$C_8$ alkyl group, or a $C_2$-$C_8$ alkenyl group, or $R^4$ and $R^5$ are taken together with the central aromatic ring to form a naphthyl group, or $R^5$ and $R^6$ are taken together with the central aromatic ring to form a naphthyl group. Specific alkenyl aromatic monomers include, for example, styrene, chlorostyrenes such as p-chlorostyrene, methylstyrenes such as alpha-methylstyrene and p-methylstyrene, and t-butylstyrenes such as 3-t-butylstyrene and 4-t-butylstyrene. In some embodiments, the alkenyl aromatic monomer is styrene.

The conjugated diene used to prepare the hydrogenated block copolymer can be a $C_4$-$C_{20}$ conjugated diene. Suitable conjugated dienes include, for example, 1,3-butadiene, 2-methyl-1,3-butadiene, 2-chloro-1,3-butadiene, 2,3-dimethyl-1,3-butadiene, 1,3-pentadiene, 1,3-hexadiene, and the like, and combinations thereof. In some embodiments, the conjugated diene is 1,3-butadiene, 2-methyl-1,3-butadiene, or a combination thereof. In some embodiments, the conjugated diene is 1,3-butadiene.

The hydrogenated block copolymer is a copolymer comprising (A) at least one block derived from an alkenyl aromatic compound and (B) at least one block derived from a conjugated diene, in which the aliphatic unsaturated group content in the block (B) is at least partially reduced by hydrogenation. In some embodiments, the aliphatic unsaturation in the (B) block is reduced by at least 50 percent, specifically at least 70 percent. The arrangement of blocks (A) and (B) includes a linear structure, a grafted structure, and a radial teleblock structure with or without a branched chain. Linear block copolymers include tapered linear structures and non-tapered linear structures. In some embodiments, the hydrogenated block copolymer has a tapered linear structure. In some embodiments, the hydrogenated block copolymer has a non-tapered linear structure. In some embodiments, the hydrogenated block copolymer comprises a (B) block that comprises random incorporation of alkenyl aromatic monomer. Linear block copolymer structures include diblock (A-B block), triblock (A-B-A block or B-A-B block), tetrablock (A-B-A-B block), and pentablock (A-B-A-B-A block or B-A-B-A-B block) structures as well as linear structures containing 6 or more blocks in total of (A) and (B), wherein the molecular weight of each (A) block can be the same as or different from that of other (A) blocks, and the molecular weight of each (B) block can be the same as or different from that of other (B) blocks. In some embodiments, the hydrogenated block copolymer is a diblock copolymer, a triblock copolymer, or a combination thereof.

In some embodiments, the hydrogenated block copolymer excludes the residue of monomers other than the alkenyl aromatic compound and the conjugated diene. In some embodiments, the hydrogenated block copolymer consists of blocks derived from the alkenyl aromatic compound and the conjugated diene. It does not comprise grafts formed from these or any other monomers. It also consists of carbon and hydrogen atoms and therefore excludes heteroatoms. In some embodiments, the hydrogenated block copolymer includes the residue of one or more acid functionalizing agents, such as maleic anhydride. In some embodiments, the hydrogenated block copolymer comprises a polystyrene-poly(ethylene-butylene)-polystyrene triblock copolymer.

Methods for preparing hydrogenated block copolymers are known in the art and many hydrogenated block copolymers are commercially available. Illustrative commercially available hydrogenated block copolymers include the polystyrene-poly(ethylene-propylene) diblock copolymers available from Kraton Performance Polymers Inc. as KRATON G1701 (having about 37 weight percent polystyrene) and G1702 (having about 28 weight percent polystyrene); the polystyrene-poly(ethylene-butylene)-polystyrene triblock copolymers available from Kraton Performance Polymers Inc. as KRATON G1641 (having about 33 weight percent polystyrene), G1650 (having about 30 weight percent polystyrene), G1651 (having about 33 weight percent polystyrene), and G1654 (having about 31 weight percent polystyrene); and the polystyrene-poly(ethylene-ethylene/propylene)-polystyrene triblock copolymers available from Kuraray as SEPTON 54044, 54055, 54077, and 54099. Additional commercially available hydrogenated block copolymers include polystyrene-poly(ethylene-butylene)-polystyrene (SEBS) triblock copolymers available from Dynasol as CALPRENE H6140 (having about 31 weight percent polystyrene), H6170 (having about 33 weight percent polystyrene), H6171 (having about 33 weight percent polystyrene), and H6174 (having about 33 weight percent polystyrene); and from Kuraray as SEPTON 8006 (having about 33 weight percent polystyrene) and 8007 (having about 30 weight percent polystyrene); polystyrene-poly(ethylene-butylene-styrene)-polystyrene tapered block copolymers available from Kraton Performance Polymers as KRATON A1535 (having 56.3-60.3 weight percent polystyrene) and A1536 (having 37-44 weight percent polystyrene); polystyrene-poly(ethylene-propylene)-polystyrene (SEPS) copolymers available from Kuraray as SEPTON 2006 (having about 35 weight percent polystyrene) and 2007 (having about 30 weight percent polystyrene); and oil-extended compounds of these hydrogenated block copolymers available from Kraton Performance Polymers Inc. as KRATON G4609 (containing about 45% mineral oil, and the SEBS having about 33 weight percent polystyrene) and G4610 (containing about 31% mineral oil, and the SEBS having about 33 weight percent polystyrene); and from Asahi as TUFTEC H1272 (containing about 36% oil, and the SEBS having about 35 weight percent polystyrene). Mixtures of two or more hydrogenated block copolymers can be used. In some embodiments, the hydrogenated block copolymer comprises a polystyrene poly(ethylene-butylene)-polystyrene triblock copolymer having a weight average molecular weight of at least 100,000 grams per mole.

When present, the thermoplastic material comprises the hydrogenated block copolymer in an amount of 5 to 50 parts by weight, based on 100 parts by weight total of thermoplastic polymer, hydrogenated block copolymer, polyolefin, and flame retardant.

In a specific embodiment, the thermoplastic material comprises a polysulfone comprising repeating structural units having the formula

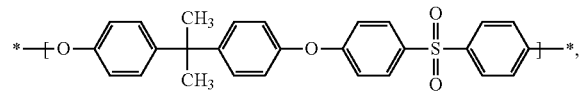

wherein the polysulfone exhibits, in an unfoamed state, a flammability index of 2 to 4, a flame growth rate of 0.5 to 1.0 kW/m²s, and a specific extinction area of 700 to 800 m²/kg.

In a specific embodiment, the thermoplastic material comprises 25 to 40 parts by weight, specifically 30 to 40 parts by weight, more specifically 30 to 35 parts by weight of a poly(2,6-dimethyl-1,4-phenylene ether) having an intrinsic viscosity of 0.3 to 0.6 deciliter per gram, specifically 0.35 to 0.5 deciliter per gram, more specifically 0.4 to 0.5 deciliter per gram; 30 to 45 parts by weight, specifically, 35 to 40 parts by weight, an impact modifier comprising a first hydrogenated block copolymer of an alkenyl aromatic monomer and a conjugated diene having a poly(alkenyl aromatic) content of 30 to 50 weight percent and a melt flow index of 5 to 10 grams per 10 minutes, measured at 260° C. and 5 kilogram load according to ASTM D1238; and a second hydrogenated block copolymer of an alkenyl aromatic monomer and a conjugated diene having a poly(alkenyl aromatic) content of 20 to 40 weight percent and a melt flow index of 2 to 8 grams per 10 minutes, measured at 230° C. and 5 kilogram load according to ASTM D1238; 10 to 20 parts by weight, specifically 10 to 15 parts by weight, of a polyolefin comprising a polybutene, a propylene homopolymer, or a combination thereof; and 10 to 15 parts by weight of a flame retardant comprising a phosphoric acid salt and a metal dialkyl phosphinate, wherein parts by weight are based on 100 parts by weight total of poly(phenylene ether), hydrogenated block copolymer, polyolefin, and flame retardant. In some embodiments, the thermoplastic material can optionally further include 1 to 5 parts by weight of an additive composition comprising a mold release agent, an antioxidant, a heat stabilizer, a metal deactivator, or a combination thereof.

In another specific embodiment, the thermoplastic material comprises 45 to 55 parts by weight, specifically, 50 to 55 parts by weight, of a poly(2,6-dimethyl-1,4-phenylene ether) having an intrinsic viscosity of 0.3 to 0.6 deciliter per gram, specifically 0.35 to 0.5 deciliter per gram, more specifically 0.4 to 0.5 deciliter per gram; 10 to 20 parts by weight of an impact modifier comprising a first hydrogenated block copolymer of an alkenyl aromatic monomer and a conjugated diene having a poly(alkenyl aromatic) content of 25 to 35 weight percent and a melt flow index of less than 1 gram per 10 minutes, measured at 230° C. and 5 kilogram load according to ASTM D1238; and a second hydrogenated block copolymer of an alkenyl aromatic monomer and a conjugated diene having a poly(alkenyl aromatic) content of 60 to 70 weight percent; 25 to 35 parts by weight, specifically 25 to 30 parts by weight, of a propylene homopolymer; and 5 to 10 parts by weight of an organophosphate ester flame retardant, wherein parts by weight are based on 100 parts by weight total of poly(phenylene ether), hydrogenated block copolymer, polyolefin, and flame retardant. In some embodiments, the thermoplastic material can optionally further include 0.5 to 1 parts by weight of an additive composition comprising a metal deactivator, one or more stabilizers, or a combination thereof.

In yet another specific embodiment, the thermoplastic material comprises 20 to 30 parts by weight, specifically, 25 to 30 parts by weight, of a poly(phenylene ether-siloxane) copolymer; 10 to 15 parts by weight of an impact modifier comprising a first hydrogenated block copolymer of an alkenyl aromatic monomer and a conjugated diene having a poly(alkenyl aromatic) content of 25 to 35 weight percent; and a second hydrogenated block copolymer of an alkenyl aromatic monomer and a conjugated diene having a poly (alkenyl aromatic) content of 25 to 35 weight percent and a melt flow index of less than 1 gram per 10 minutes, measured at 230° C. and 5 kilogram load according to ASTM D1238; 30 to 35 parts by weight of a polyolefin comprising a polybutene, a propylene homopolymer, an ethylene copolymer, or a combination thereof; and 25 to 35 parts by weight of a surface-treated metal hydroxide; wherein parts by weight are based on 100 parts by weight total of poly(phenylene ether), hydrogenated block copolymer, polyolefin, and flame retardant. In some embodiments, the thermoplastic material can optionally further include 1 to 5 parts by weight of an additive composition comprising a mold release agent, an antioxidant, a heat stabilizer, a metal deactivator, a fragrance, or a combination thereof.

In some embodiments, when the thermoplastic material comprises a poly(phenylene ether), the thermoplastic material exhibits, in its unfoamed state, a flammability index of 8 to 14, a flame growth rate of 0.5 to 1.2 kW/m²s, and a specific extinction are of 500 to 1200 m²/kg. In some embodiments, when the thermoplastic material comprises a poly(phenylene ether), the thermoplastic material exhibits, in its unfoamed state, a tensile elongation at break of 150 to 300% determined according to UL 1581 at a temperature of 23° C., using a coated wire test sample, and a dielectric constant of 2.5 to 3 determined according to ASTM D150-11 at 1 MHz.

As used herein, the term "polybutene" refers to a polymer comprising at least 75 weight percent of units, specifically at least 80 weight percent of units, derived from 1-butene, 2-butene, 2-methylpropene (isobutene), or a combination thereof. The polybutene may be a homopolymer or a copolymer. In some embodiments, the polybutene consists of units derived from 1-butene, 2-butene, 2-methylpropene (isobutene), or a combination thereof. In other embodiments, the polybutene is a copolymer that comprises 1 to 25 weight percent of a copolymerizable monomer such as ethylene, propylene, or 1-octene. In some embodiments, the polybutene is a homopolymer of 2-methylpropene. In other embodiments, the polybutene is a copolymer of 2-methylpropene with 1-butene and/or 2-butene. In still other embodiments, the polybutene is a combination of a homopolymer of 2-methylpropene, and a copolymer of 2-methylpropene with 1-butene and/or 2-butene. The polybutene has a number average molecular weight of 500 to 1500 grams/ mole. Number average molecular weight can be determined by gel permeation chromatography using polystyrene standards. Within the range of 500 to 1500 grams/mole, the number average molecular weight can be 600 to 1400 grams/mole, specifically 600 to 1200 grams/mole.

The propylene homopolymer can be atactic, syndiotactic, isotactic, or a combination thereof. In some embodiments, the polypropylene is an atactic polypropylene having a melt flow rate of 4 to 16 grams per 10 minutes, specifically 5 to 12 grams per 10 minutes, measured at 230° C. and 2.16 kilogram load according to ASTM D1238-13. Suitable polypropylenes are commercially available as, for example, PP 570P Resin from SABIC, and PP1304E3 Resin from ExxonMobil.

The phosphoric acid salt can be a nitrogen-containing flame retardant, including those comprising a nitrogen-containing heterocyclic base and a phosphate or pyrophosphate or polyphosphate acid. In some embodiments, the nitrogen-containing flame retardant has the formula

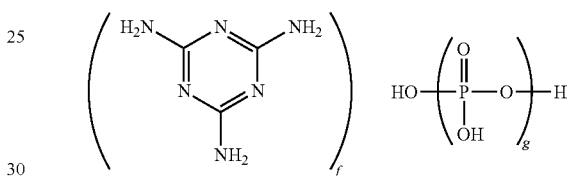

wherein g is 1 to 10,000, and the ratio off tog is 0.5:1 to 1.7:1, specifically 0.7:1 to 1.3:1, more specifically 0.9:1 to 1.1:1. It will be understood that this formula includes species in which one or more protons are transferred from the phosphate group(s) to the melamine group(s). When g is 1, the nitrogen-containing flame retardant is melamine phosphate (CAS Reg. No. 20208-95-1). When g is 2, the nitrogen-containing flame retardant is melamine pyrophosphate (CAS Reg. No. 15541 60-3). When g is, on average, greater than 2, the nitrogen-containing flame retardant is a melamine polyphosphate (CAS Reg. No. 56386-64-2). In some embodiments, the nitrogen-containing flame retardant is melamine pyrophosphate, melamine polyphosphate, or a mixture thereof. In some embodiments in which the nitrogen-containing flame retardant is melamine polyphosphate, g has an average value of greater than 2 to 10,000, specifically 5 to 1,000, more specifically 10 to 500. In some embodiments in which the nitrogen-containing flame retardant is melamine polyphosphate, g has an average value of greater than 2 to 500. Methods for preparing melamine phosphate, melamine pyrophosphate, and melamine polyphosphate are known in the art, and all are commercially available. For example, melamine polyphosphates may be prepared by reacting polyphosphoric acid and melamine, as described, for example, in U.S. Pat. No. 6,025,419 to Kasowski et al., or by heating melamine pyrophosphate under nitrogen at 290° C. to constant weight, as described in U.S. Pat. No. 6,015,510 to Jacobson et al. In some embodiments, the nitrogen-containing flame retardant comprises melamine polyphosphate.

As used herein, the term "metal dialkylphosphinate" refers to a salt comprising at least one metal cation and at least one dialkylphosphinate anion. In some embodiments, the metal dialkylphosphinate has the formula

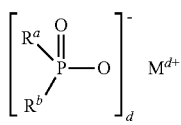

wherein $R^a$ and $R^b$ are each independently $C_1$-$C_6$ alkyl; M is calcium, magnesium, aluminum, or zinc; and d is 2 or 3. Examples of $R^a$ and $R^b$ include methyl, ethyl, n-propyl, isopropyl, n-butyl, tert-butyl, and n-pentyl. In some embodiments, $R^a$ and $R^b$ are ethyl, M is aluminum, and d is 3 (that is, the metal dialkylphosphinate is aluminum tris(diethylphosphinate)).

Exemplary organophosphate ester flame retardants include phosphate esters comprising phenyl groups, substituted phenyl groups, or a combination of phenyl groups and substituted phenyl groups, bis-aryl phosphate esters based upon resorcinol such as, for example, resorcinol bis(diphenyl phosphate), as well as those based upon bisphenols such as, for example, bisphenol A bis(diphenyl phosphate). In some embodiments, the organophosphate ester is selected from tris(alkylphenyl) phosphates (for example, CAS Reg. No. 89492-23-9 or CAS Reg. No. 78-33-1), resorcinol bis(diphenyl phosphate) (CAS Reg. No. 57583-54-7), bisphenol A bis(diphenyl phosphate) (CAS Reg. No. 181028-79-5), triphenyl phosphate (CAS Reg. No. 115-86-6), tris (isopropylphenyl) phosphates (for example, CAS Reg. No. 68937-41-7), t-butylphenyl diphenyl phosphates (CAS Reg. No. 56803-37-3), bis(t-butylphenyl) phenyl phosphates (CAS Reg. No. 65652-41-7), tris(t-butylphenyl) phosphates (CAS Reg. No. 78-33-1), and combinations thereof.

In some embodiments the organophosphate ester comprises a bis-aryl phosphate having the formula

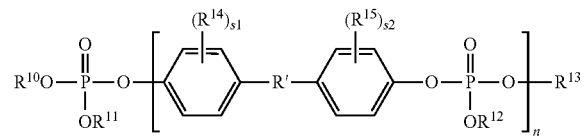

wherein R' is independently at each occurrence a $C_1$-$C_{12}$ alkylene group; $R^{14}$ and $R^{15}$ are independently at each occurrence a $C_1$-$C_5$ alkyl group; $R^{10}$, $R^{11}$, and $R^{13}$ are independently a $C_1$-$C_{12}$ hydrocarbyl group; $R^{12}$ is independently at each occurrence a $C_1$-$C_{12}$ hydrocarbyl group; n is 1 to 25; and s1 and s2 are independently an integer equal to 0, 1, or 2. In some embodiments $OR^1$, $OR^2$, $OR^3$ and $OR^4$ are independently derived from phenol, a monoalkylphenol, a dialkylphenol, or a trialkylphenol.

As readily appreciated by one of ordinary skill in the art, the bis-aryl phosphate is derived from a bisphenol. Exemplary bisphenols include 2,2-bis(4-hydroxyphenyl)propane (bisphenol A), 2,2-bis(4-hydroxy-3-methylphenyl)propane, bis(4-hydroxyphenyl)methane, bis(4-hydroxy-3,5-dimethylphenyl)methane and 1,1-bis(4-hydroxyphenyl)ethane. In some embodiments, the bisphenol comprises bisphenol A.

Suitable metal hydroxides include all those capable of providing fire retardancy, as well as combinations of such metal hydroxides. The metal hydroxide can be chosen to have substantially no decomposition during processing of the fire additive composition and/or flame retardant thermoplastic composition. Substantially no decomposition is defined herein as amounts of decomposition that do not prevent the flame retardant additive composition from providing the desired level of fire retardancy. Exemplary metal hydroxides include, but are not limited to, magnesium hydroxide (for example, CAS Reg. No. 1309-42-8), aluminum hydroxide (for example, CAS Reg. No. 21645-51-2), cobalt hydroxide (for example, CAS Reg. No. 21041-93-0), and combinations thereof. In some embodiments, the metal hydroxide comprises magnesium hydroxide. In some embodiments the metal hydroxide has an average particle size less than or equal to 10 micrometers and/or a purity greater than or equal to 90 weight percent. In some embodiments it is desirable for the metal hydroxide to contain substantially no water, for example as evidenced by a weight loss of less than 1 weight percent upon drying at 120° C. for 1 hour. In some embodiments the metal hydroxide can be surface-treated, for example, with an aminosiloxane. Exemplary aminosiloxane-treated magnesium hydroxides include those available under the tradename MAGNIFIN H-5IV, available from Albemarle.

Suitable examples of poly(phenylene ether)-containing thermoplastic materials can include Flexible Noryl Resin available from SABIC, for example, WCA871A, WCA875, WCA901, WCD835, WCD841U, WCD891B, and WCV072.

Another aspect of the present disclosure is a process of forming a foamed thermoplastic material. The process comprises melt-kneading an unfoamed thermoplastic material in the presence of a carbon dioxide-generating blowing agent under conditions effective to provide a foamed thermoplastic material. In some embodiments, the unfoamed thermoplastic material and the carbon dioxide-generating blowing agent can be melt-kneaded at a maximum temperature of 220 to 280° C. The temperature at which the melt-kneading is carried out is preferably greater than or equal to the decomposition temperature of the blowing agent, for example 10 to 100° C., or 20 to 80° C. greater than the decomposition temperature of the blowing agent. In some embodiments, the maximum temperature is greater than or equal to the decomposition temperature of the blowing agent.

The unfoamed thermoplastic material can be as described above. The unfoamed thermoplastic material exhibits a flammability index (FI) of 0.1 to 15, determined according to ASTM D7309 Method A at a heating rate of 1° C. per second under nitrogen from 25 to 750° C., a flame growth rate (FIGRA) of 0.1 to 1.5 kW/m²s, determined according to ASTM E1354 or ISO 5660 using an applied heat flux of 35 kilowatt per square meter, and a specific extinction area (SEA) of 300 to 1200 m² per kilogram, determined according to ASTM E1354 or ISO 5660 using an applied heat flux of 35 kilowatt per square meter. The unfoamed thermoplastic material further exhibits a tensile elongation of greater than 100%, measured according to UL 1581 at a temperature of 23° C., using a coated wire test sample; and a dielectric constant of 2 to 4, determined according to ASTM D150-11 at 1 MHz. In some embodiments, the unfoamed thermoplastic material comprises a thermoplastic polymer selected from the group consisting of a poly(phenylene ether), a polysulfone, and combinations thereof. The unfoamed thermoplastic material can optionally further comprise various additives, impact modifiers, and the like, as described above.

The blowing agent is a carbon dioxide-generating blowing agent. The blowing agent can be a chemical blowing agent, a physical blowing agent, or a combination thereof. In some embodiments, the blowing agent is preferably a carbon dioxide-generating chemical blowing agent. A carbon dioxide-generating chemical blowing agent is one which generates carbon dioxide upon chemical decomposition. Exemplary carbon dioxide-generating chemical blowing agents can include sodium bicarbonate, calcium bicarbonate, and the like, and combinations thereof. In some embodiments, the carbon dioxide-chemical blowing agent comprises sodium bicarbonate. In some embodiments the carbon dioxide-generating chemical blowing agent can further comprise an inert polymer matrix or carrier, for example a polyolefin (e.g., polyethylene), or the like. In some embodiments, a physical blowing agent can be used. Physical blowing agents can include, for example, carbon dioxide, nitrogen, water, acetone, butane, and argon. Exemplary commercial blowing agents useful for cable foaming can include, but are not limited to, 6257 ID Endo Foam 35 XFC, 5767 ID Endo Foam IOOFC, 8812 ID Exo Foam 80, 8861 ID 25, 6851 ID 35 MFC, 6400 ID 35 NA, 6295 ID 70 XFC, 6265 ID 70 MFC, 7800 ID 70 NA, 6905 ID 90 NA, 6906 ID 90 NA FC, 6258 ID 100 XFC 100, 6836 ID 130 MFC, 6950 ID 40 EEFC, 6952 ID 40 EEXFC, 6112 ID 70 EEFC, 6833 ID 70 EEFC, 8085 ID 70 EEMFC, 7236 ID Foam EEFC, 7284 ID 80 2300 EXO, 7285 OD 80 2400 EXO, 71531 ID 100 MFC EXO, 8016 ID 120 EXO, 6831 ID 135 EXO, Palmarole EXP 141/92B, Palmarole BA.K2.S1, Palmarole BA.F4.S, Palmarole BA.F2.S, Palmarole BA.K5.S, Palmarole BA.F4.E.MG, Palmarole BA.K3.EF, Palmarole BA.M4.E, Palmarole MB.BA10, Palmarole MB.BA.13, Palmarole MB.BA.15, Palmarole MB.BA.16, Palmarole MB.BA.18, Palmarole BA.M7.E, Palmarole BA.K2.S1, Palmarole BA.F4.S, Palmarole BA.K4.S, Palmarole BA.F2.S, Palmarole BA.K3.EF, Palmarole BA.K4.C, and Bergen International Foamazol™ series 32, 40, 41, 43, 50, 57, 60, 61, 62, 63, 70, 71, 72, 73, 73S, 90, 91, 92, 93, 94, 95, 96, as well as XO-255, XO-256, XO-286, XO-330, XO-339, XO-355, XO-379, XO-385, XO-423, XOP-301, XOP-305 and XOP-341.

In a specific embodiment, an example of a suitable carbon dioxide-generating chemical blowing agent includes Palmarole MB.BA.18, available from Adeka Palmarole.

In some embodiments, the carbon dioxide-generating chemical blowing agent has a decomposition temperature of 150 to 250° C., specifically 180 to 220° C., more specifically 190 to 210° C.

The particular amount of blowing agent used to form the foamed composition can depend on the particular process and materials used. In some embodiments, the carbon dioxide-generating blowing agent is used in an amount of 0.05 wt. % to 10 wt. %, or, specifically, 0.1 wt. % to 5 wt. %, or, more specifically, 0.2 wt. % to 1 wt. %, based on the total weight of the blowing agent and the unfoamed thermoplastic material.

The resulting foamed thermoplastic material comprises a plurality of cells having a number average mean diameter of 5 to 150 micrometers. The cells are present in an amount effective to provide a foamed material with a density that is 10 to 90 percent of the density of the unfoamed thermoplastic material. In some embodiments, the foamed thermoplastic material has a density of 0.3 to 3 g/cm$^3$, determined at 23° C. In some embodiments, the foamed thermoplastic material is a closed cell foam. The foamed thermoplastic material can further exhibit a tensile elongation of 100 to 500%, measured according to UL 1581 at a temperature of 23° C., using a coated wire test sample, and a dielectric constant of 1.4 to 4, determined according to ASTM D150-11 at 1 MHz.

Another aspect of the present disclosure is an article comprising the foamed thermoplastic material. The foamed thermoplastic material can be as described above, or can be a foamed thermoplastic material prepared according to the above-described process. In some embodiments, the article comprising the foamed thermoplastic material can be a plenum cable. Such cables are used as optical fiber or metallic conductors (specific uses include data and voice transmission cables) that are installed in building plenums (i.e., in spaces above dropped ceilings or below raised floors) that are often used to return air to conditioning equipment controlling room climate conditions.

A plenum cable can be as shown in FIG. 1. As shown in FIG. 1, a data communication cable 10 includes at least one communications transmission medium, and typically twisted pairs of communications transmission media. The core can also comprise a separator spline 70 or a structure that provides strength to the cable. As shown in FIG. 1, the core can comprise four twisted pairs 30, 40, 50 and 60. The twisted pairs, sometimes referred to as "twisted communications transmission media," each comprise a conductor 80 that is surrounded by an insulator layer. The conductors 80 are typically optical fibers such as glass or metal conductor wires such as copper wires. Each conductor can be separately coated with insulation, or bundles of the conductors can be coated with insulation. A sheath or jacket 20 surrounds the separator spline 70 and the twisted conductor pairs 30, 40, 50 and 60.

The foamed thermoplastic materials disclosed herein can be particularly useful for forming an insulation layer for conductor wires, for example of a plenum cable. Thus, an embodiment is a plenum cable comprising a core comprising a transmission medium, where the transmission medium is enclosed by a primary insulation formed from the foamed thermoplastic material described herein. The foamed thermoplastic material can be applied to the transmission medium by a suitable method such as extrusion coating to form a coated wire. In some embodiments, the plenum cable can include more than one transmission medium, for example two to four transmission media. When the plenum cable includes more than one transmission medium, at least one transmission medium includes the foamed thermoplastic material as insulation. In some embodiments, the insulation surrounding the conductor of the transmission medium can comprise multiple layers, for example alternating layers comprising the foamed thermoplastic material and a solid (i.e., unfoamed) thermoplastic material. In some embodiments, the transmission medium of the plenum cable comprises an optical fiber, a conductor wire, or a combination thereof. In some embodiments, the plenum cable comprises a conductor wire. Suitable materials for the conductor wire include copper, aluminum, lead, gold, silver, iron, nickel, chromium, and alloys thereof. In an exemplary embodiment, the conductor wire is copper.

The cross-sectional area of the conductor wire and thickness of the insulating layer disposed thereon can vary. In some embodiments, the insulating layer comprising the foamed thermoplastic material can have a thickness of 0.01 to 10 millimeters, specifically 0.05 to 5 millimeters, more specifically, 0.1 to 1 millimeter.

A process for coating a conductor wire represents another aspect of the present disclosure. The process comprises preheating a conductor wire to a temperature of 150 to 220° C. The conductor wire can be as described above. In some embodiments, the conductor wire is a copper wire. The process further comprises contacting the preheated conductor wire with an unfoamed thermoplastic material and a carbon dioxide-generating blowing agent. The contacting is conducted under conditions effective to provide a foamed thermoplastic material substantially surrounding the conductor wire. For example, in some embodiments, the contacting is in an extruder having a feed zone temperature of 180 to 200° C. and an exit die temperature of 220 to 280° C. An example of such a process is further described in the working examples below.

The unfoamed thermoplastic material can be as described above, and exhibits a flammability index of 0.1 to 15, determined according to ASTM D7309 Method A at a heating rate of 1° C. per second under nitrogen from 25 to 750° C., a flame growth rate of 0.1 to 1.5 kW/m²s, determined according to ASTM E1354 or ISO 5660 using an applied heat flux of 35 kilowatt per square meter, and a specific extinction area of 300 to 1200 m² per kilogram, determined according to ASTM E1354 or ISO 5660 using an applied heat flux of 35 kilowatt per square meter. The unfoamed thermoplastic material further exhibits a tensile elongation of greater than 100%, measured according to UL 1581 at a temperature of 23° C., using a coated wire test sample; and a dielectric constant of 2 to 4, determined according to ASTM D150-11 at 1 MHz. In some embodiments, the thermoplastic material preferably comprises a thermoplastic polymer selected from a poly(phenylene ether), a polysulfone, and combinations thereof. The blowing agent can be as described above, and can preferably be a chemical blowing agent. In some embodiments, the carbon dioxide-generating chemical blowing agents comprises sodium bicarbonate. In some embodiments, the carbon dioxide-generating chemical blowing agent has a decomposition temperature of 150 to 250° C. In some embodiments, the chemical blowing agent is provided in an amount of 0.1 to 5 weight percent, based on the total weight of the chemical blowing agent and the unfoamed thermoplastic material.

The resulting foamed thermoplastic material has a plurality of cells having a number average mean diameter of 5 to 150 micrometers, wherein the cells are present in an amount effective to provide a foamed material with a density that is 10 to 90 percent of the density of the unfoamed thermoplastic material. For example, the foamed thermoplastic material can have a density of 0.3 to 3 g/cm³, measured at 23° C. The foamed thermoplastic material coating the conductor wire further exhibits a tensile elongation of 100 to 500%, measured according to UL 1581 at a temperature of 23° C., using a coated wire test sample, and a dielectric constant of 1.4 to 4, determined according to ASTM D150-11 at 1 MHz.

The invention is further illustrated by the following non-limiting examples.

EXAMPLES

Materials used for the following Examples are described in Table 1.

TABLE 1

| Component | Description |
|---|---|
| PPE 0.46 | Poly(2,6-dimethyl-1,4-phenylene ether), CAS Reg. No. 25134-01-4, having an intrinsic viscosity of about 0.46 deciliter per gram as measured in chloroform at 25° C.; obtained as PPO 646 from SABIC Innovative Plastics |
| PPE-Si | A mixture of poly(2,6-dimethyl-1,4-phenylene ether) (CAS Reg. No. 24938-67-8) and poly(2,6-dimethyl-1,4-phenylene ether-polydimethylsiloxane block copolymer (CAS Reg. No. 1202019-56-4), the mixture having a polysiloxane content of about 5 weight percent and an intrinsic viscosity of about 0.40 deciliter per gram as measured in chloroform at 25° C.; prepared according to the procedure of U.S. Pat. No. 8,017,697 to Carrillo et al., Example 16. |
| PSU | Polysulfone derived from the polycondensation of a 4,4'-dihalodiphenylsulfone and Bisphenol-A (CAS Reg. No. 25135-51-7); obtained as UDEL P-1700 NT from Solvay Advanced Polymers, L.L.C. |
| SEBS-1 | Polystyrene-poly(ethylene-butylene)-polystyrene triblock copolymer, CAS Reg. No. 66070-58-4, having a polystyrene content of about 30-33 weight percent and a negligible melt flow, measured at 260° C. and 5 kilogram load according to ASTM D1238; obtained as KRATON G1651 from Kraton Performance Polymers Inc |
| SEBS-2 | Polystyrene-poly(ethylene-butylene)-polystyrene triblock copolymer, CAS Reg. No. 66070-58-4, having a polystyrene content of about 27.7-30.7 weight percent, and a melt flow index of <1 gram per 10 minutes, measured at 230° C. and 5 kilogram load according to ASTM D1238; obtained as KRATON G1650 from Kraton Performance Polymers Inc |
| SEBS-3 | Polystyrene-poly(ethylene-butylene-styrene)-polystyrene tapered triblock copolymer, having a polystyrene content of 37 to 44 weight percent, a pre-hydrogenation vinyl content of less than 50 mole percent, based on moles of incorporated polybutadiene, and a melt flow index of 7 grams per 10 minutes, measured at 260° C. and 5 kilogram load according to ASTM D1238; obtained as KRATON A1536 HU Resin from Kraton Performance Polymers. |
| SEBS-4 | Polystyrene-poly(ethylene-butylene)-polystyrene triblock copolymer, CAS Reg. No. 66070-58-4, having a polystyrene content of 30 weight percent, and a melt flow index of 5 grams per 10 minutes, measured at 230° C. and 5 kilogram load; obtained as KRATON G1652 from Kraton Performance Polymers |
| SEBS-5 | Polystyrene-poly(ethylene-butylene)-polystyrene triblock copolymer, CAS Reg. No. 66070-58-4, having a polystyrene content of 67 weight percent; obtained as TUFTEC H1043 from Asahi Chemical. |
| PB | Polybutene (CAS Reg. No. 9003-29-6) |
| PP-1 | Propylene homopolymer (CAS Reg. No. 9003-07-0); obtained as PP 570P from SABIC Innovative Plastics |
| PP-2 | Propylene homopolymer (CAS Reg. No. 181028-79-5) |
| Exact 8201 | Ethylene-octene copolymer (CAS Reg. No. 26221-73-8) having a melt flow index of 1 gram per 10 minutes; obtained as Exact 8201 from Exxon Chemicals |
| Exact 8210 | Ethylene-octene copolymer (CAS Reg. No. 26221-73-8) hacing a melt flow index of 10 grams per 10 minutes; obtained as Exact 8210 from Exxon Chemicals |
| POE-g-MAH | Maleic anhydride-grafted poly(ethylene-co-1-octene), having a melt flow rate of 1.6 grams per 10 minutes, measured at 190° C. and 2.16 kilogram load according to ASTM D1238; obtained as FUSABOND N493 from DuPont |
| MPP | Melamine polyphosphate, CAS Reg. No. 218768-84-4, obtained as BUDIT 3141 from Budenheim Iberica, S.A. |

TABLE 1-continued

| Component | Description |
|---|---|
| DEPAL | Aluminum tris(diethyl phosphinate), CAS Reg. No. 225789-38-8; obtained as EXOLIT OP1230 from Clariant |
| BPADP | Bisphenol A bis(diphenyl phosphate), CAS Reg. No. 181028-79-5; obtained as CR-741 from Daihachi Chemical, as FYROLFLEX BDP from Supresta LLC, or as REOFOS BAPP from Great Lakes Chemical Co. Ltd. |
| $Mg(OH)_2$ | Magnesium dihydroxide (CAS Reg. No. 1309-42-8); surface treated with aminosiloxane; obtained as MAGNIFIN H-5IV from Albemarle |
| Erucamide | Erucamide (CAS Reg. No. 112-84-5); obtained as KEMAMIDE E Ultra from Crompton Corp. |
| AO-1 | Octadecyl 3,5-di-tert-butyl-4-hydroxyhydrocinnamate (CAS Reg. No. 2082-79-3); obtained as IRGANOX 1076 from BASF. |
| AO-2 | Reaction products of phosphorus trichloride with 1,1'-biphenyl and 2,4-bis(1,1-dimethylethyl)phenol (CAS Reg. No. 119345-01-6); obtained as HOSTANOX P-EPQ from Clariant |
| AO-3 | Pentaerythritol tetrakis(3-(3,5-di-tert-butyl-4-hydroxyphenyl)propionate) (CAS Reg. No. 6683-19-8); obtained as IRGANOX 1010 from BASF |
| MD 1024 | 2',3-bis[[3-[3,5-di-tert-butyl-4-hydroxyphenyl]propionyl]] propionohydrazide (CAS Reg. No. 32687-78-8); obtained as IRGANOX MD 1024 from BASF |
| ZnS | Zinc sulfide (CAS Reg. No. 1314-98-3); obtained as SACHTOLITH HD-S from Sachtleben Chemie GmbH. |
| MgO | Magnesium oxide, CAS Reg. No. 1309-48-4; obtained as KYOWAMAG 150 from Kyowa Chemical Co. Ltd. |
| TBPP | Tris(2,4-di-tert-butylphenyl) phosphite, CAS Reg. No. 31570-04-4; obtained as IRGAFOS 168 from BASF |
| Fragrance | Polyethylene-encapsulated fragrance; obtained as POLYIFF ™ 7191-PBD from International Flavors and Fragrances Inc. |
| CBA | Chemical blowing agent of sodium bicarbonate carried by polyethylene (CAS Reg. No.); obtained as Palmarole MB.BA.18 from Adeka Palmarole |

The flame retardant performance of four thermoplastic materials (unfoamed) was tested using a Microscale Combustion calorimeter (MCC) as well as a cone calorimeter. In the MCC test (according to ASTM D7309), 4-5 milligrams of each sample was tested. The samples were tested under a nitrogen atmosphere. The heating rate was 1° C. per second and the maximum decomposition temperature was 750° C. The temperature of the combustor chamber was maintained at 900° C. Oxygen (20 millimeters per minute) and nitrogen (80 mL/min) were supplied to the equipment during the test.

In the cone calorimeter testing (according to ISO5660/ASTM E1354), the applied heat flux was 35 kilowatts per square meter. The dimensions of the samples were about 100×100×3 millimeters. Each sample was wrapped in aluminum foil with only one surface horizontally exposed to the applied heat flux. The distance between the cone heater and the sample surface was 60 millimeters.

The flammability index (FI) for each thermoplastic material (unfoamed) was determined according to ASTM D7309 Method A. MCC was used to calculate FI according to Equation 1, where Tp is the temperature at the peak heat release rate (PHRR) and THR refers to total heat release.

$$FI=(PHRR)/160*(THR)/12*548/(Tp) \quad \text{Equation 1}$$

Flame Growth Rate (FIGRA), determined using the cone calorimeter according to ASTM E1354 or ISO 5660, was used to compare flame retardancy performance of the thermoplastic materials. FIGRA was calculated as (peak heat release rate)/(elapsed time to peak heat release). Specific Extinction Area (SEA) was used to compare smoke performance SEA was determined according to ASTM E1354 or ISO 5660.

The compositions of the thermoplastic materials tested, and the measured FI, FIGRA, and SEA are shown in Table 2. The amount of each component is expressed in parts by weight, based on 100 parts by weight of poly(phenylene ether), polysulfone, hydrogenated block copolymer (SEBS-1, SEBS-2, SEBS-3, SEBS-4, and SEBS-5), polyolefin (PB, PP-1, PP-2, Exact 8201, Exact 8210, and POE-g-MAH)), and flame retardant (MPP, DEPAL, BPADP, and $Mg(OH)_2$).

TABLE 2

| Component | Example 1 | Example 2 | Example 3 | Example 4 |
|---|---|---|---|---|
| PPE 0.46 | 34 | | 52 | |
| PPE-Si | | 26 | | |
| PSU | | | | 100 |
| SEBS-1 | | 6 | | |
| SEBS-2 | | 6 | 6 | |
| SEBS-3 | 28 | | | |
| SEBS-4 | 11 | | | |
| SEBS-5 | | | 6 | |
| PB | 8 | 5 | | |
| PP-1 | 5 | 3 | | |
| PP-2 | | | 29 | |
| Exact 8201 | | 7 | | |
| Exact 8210 | | 12 | | |
| POE-g-MAH | | 5 | | |
| MPP | 7 | | | |
| DEPAL | 7 | | | |
| BPADP | | | 9 | |
| $Mg(OH)_2$ | | 30 | | |
| Erucamide | 0.50 | 0.29 | | |
| AO-1 | 0.75 | 0.75 | | |
| AO-2 | 0.25 | 0.25 | | |
| AO-3 | | | 0.30 | |
| MD 1024 | 0.10 | 0.10 | 0.10 | |
| ZnS | | | 0.10 | |
| MgO | | | 0.10 | |
| TBPP | | | 0.20 | |
| Fragrance | | 0.06 | | |
| FR and Smoke Properties | | | | |
| FIGRA | 0.5 | 1.1 | 1.0 | 0.8 |
| SEA ($m^2$/kg) | 1044 | 515 | 1157 | 761 |
| FI | 12.9 | 8.0 | 13.6 | 3.7 |
| Tensile Elong. at brk (%) | 198.4 | 270.6 | 213.3 | NM |
| Dielectric Constant[1] | 2.7 | 2.7 | 2.7 | 3.02 |

[1]Determined at 1 MHz;
"NM" means "not measured"

As shown in Table 2, each of the thermoplastic materials according to Examples 1-4 exhibited desirable smoke and flame retardant properties. In particular, each of the thermoplastic materials according to Examples 1-4 exhibited a FI of less than 15, a FIGRA of less than 1.5, and a SEA of less than 1200. Thermoplastic materials meeting these criteria can be particularly useful for applications including insulation for plenum cables.

Each of the thermoplastic materials according to Examples 1-4 shown in Table 2 were foamed and the properties of the resulting foams were characterized. An advantage of foamed materials (e.g., for use in foamed insulation) is that the foaming reduces the amount of material available to burn compared to solid materials. Therefore the corresponding foamed materials can exhibit improved flame retardance and reduced smoke production, in addition to being lighter weight materials.

Furthermore, introduction of the foam cells (also referred to as the "void fraction" of the foam) can result in a significant decrease of the dielectric constant of the material, which can reduce signal loss from a plenum cable when used as insulation for such a cable. Thus, a low (e.g., less than 3) dielectric constant can be considered a key parameter for determining the utility of a foamed material in plenum cable applications.

Accordingly, each of the thermoplastic materials having the compositions described above were foamed in the presence of a copper conductor wire, and the dielectric constant and mechanical properties of the resulting foams were characterized. The results are shown in Tables 3A-3B, below. For each composition, several foams were prepared having different extents of foaming.

The foamed materials of Tables 3A-3B were prepared by preheating the copper wire conductor, and contacting the copper wire with the thermoplastic materials described above in the presence of a carbon dioxide generating chemical blowing agent (CBA) in an extruder. The amount of CBA used to prepare the foams is shown in Tables 3A-3B as weight percent, based on the total weight of the unfoamed thermoplastic material and the CBA.

TABLE 3A

| | Example | | | | | | |
|---|---|---|---|---|---|---|---|
| | 1A* | 1B | 1C | 1D | 1E | 1F | 1G |
| CBA | 0 | 1% | 1% | 1% | 1% | 1% | 1% |
| Foam extent[1] | 0 | 27.6% | 33.4% | 51.4% | 49.4% | 18.2% | 20.5% |
| Specific Gravity (g/cm³) | 1.03 | 0.75 | 0.69 | 0.50 | 0.52 | 0.84 | 0.82 |
| Dieletric Constant[2] | 2.7 | 2.1 | 2.1 | 1.7 | 1.8 | 2.1 | 2.1 |
| Tensile Strength (MPa) | 23.25 | NM | NM | 12.14 | NM | NM | NM |
| Tensile Elong. at brk (%) | 198.4 | NM | NM | 161.4 | NM | NM | NM |

*Denotes Comparative Example;
"NM" means "not measured";
[1]Foam extent was calculated as $(1 - (\rho_f/\rho_s)) \times 100$, where $\rho_f$ is the density of the foam and $\rho_s$ is the density of the solid;
[2]Determined at 1 MHz for 1A*; Calculated as $\log \varepsilon^* = (D^*/D)\log \varepsilon$, where $\varepsilon^*$ is permittivity of the foamed material, $\varepsilon$ is permittivity of the solid material, $D^*$ is volume mass of foamed material, and D is density of solid material for 1B-1G.

TABLE 3B

| | Example | | | |
|---|---|---|---|---|
| | 2A* | 2B | 3A* | 3B |
| CBA | 0 | 1% | 0 | 1% |
| Foam extent[1] | 0 | 22.3% | 0 | 22.64% |
| Specific Gravity (g/cm³) | 1.14 | 0.89 | 1.03 | 0.8 |
| Dieletric Constant[2] | 2.7 | 2.2 | 2.7 | 2.2 |
| Tensile Strength (MPa) | 22.8 | 10.6 | 58 | 20.5 |
| Tensile Elong. at brk (%) | 270.6 | 180.1 | 213.3 | 66.6 |

*Denotes Comparative Example;
"NM" means "not measured";
[1]Foam extent was calculated as $(1 - (\rho_f/\rho_s)) \times 100$, where $\rho_f$ is the density of the foam and $\rho_s$ is the density of the solid;
[2]Determined at 1 MHz for 2A* and 3A*;
Calculated as $\log \varepsilon^* = (D^*/D)\log \varepsilon$, where $\varepsilon^*$ is permittivity of the foamed material, $\varepsilon$ is permittivity of the solid material, $D^*$ is volume mass of foamed material, and D is density of solid material for 2B and 3B.

Example 1A* is a Comparative Example illustrating the properties of the unfoamed thermoplastic material corresponding to the Example 1 composition described in Table 2. Examples 1B-G are the corresponding Example 1 foamed materials having varying foaming extents. As shown in Table 3A, each of the foamed materials according to Examples 1B-G exhibited a dielectric constant of about 1.7-2.1, which is reduced compared to the dielectric constant of the corresponding unfoamed thermoplastic material. The tensile properties of the foamed composition having the highest foam extent (Example 1D, having a foam extent of 51.4%) were tested. The Example 1D foam exhibited a tensile strength of 12.14 MPa and a tensile elongation at break of 161.4%. Since the tensile properties of a foamed material will typically improve as the foaming extent is decreased, the tensile properties of the remaining Examples were not tested, as they necessarily exhibit the desired tensile strength and elongation (e.g., a tensile elongation of greater than 100%).

Similarly, Comparative Examples 2A* and 3A* illustrate the properties of unfoamed thermoplastic materials corresponding to Examples 2 and 3 described in Table 2, respectively. Example 2B and 3B are the corresponding Example 2 and 3 foamed materials. As shown in Table 3B, the foamed material of Example 2B exhibited a tensile strength of 10.6 MPa, and a tensile elongation at break of 180.1%. Similarly, the foamed composition of Example 3B exhibited a tensile strength of 20.5 and a tensile elongation at break of 66.6%.

Various process parameters were explored to obtain the desired foamed materials (e.g., extruder temperature, setup, type, blowing agent loading, conductor wire preheating, cooling conditions, and the like). Preheating the copper conductor was selected such that sufficient foaming occurs close to the inner core of insulation. It should be noted that a higher preheating temperature of the conductor is not necessarily better because an overheated condition may lead to over-oxidation of copper and result in the deterioration of the copper conductor and the tensile strength of the foamed material. Generally, the preheating temperature for the present examples was 150 to 200° C. With respect to the exit die temperature of the extruder, a temperature of 240 to 260° C., preferably 240 to 250° C. resulted in a desirable foam structure.

Exemplary processing conditions for Examples 1A-G, 2A-B, and 3A-B are shown in Table 4.

TABLE 4

| Example | Extruder Temperature Profile (feed zone → exit die; ° C.) | Preheat Temperature of Cu conductor (° C.) | Distance of exit die to water bath (cm) | Foam Extent (%) | Uniformity of Cell Size | CBA Loading (wt %) |
|---|---|---|---|---|---|---|
| 1A* | 210-220-230-240-240-240-240 | 170 | — | 0 | — | — |
| 1B | 185-195-230-240-240-240-240 | 200 | 9 | 27.6 | Uniform | 1% |
| 1C | 185-195-230-240-240-240-240 | 200 | 15 | 33.4 | Uniform | 1% |
| 1D | 185-195-230-240-240-240-240 | 200 | 23 | 51.4 | Uniform | 1% |
| 1E | 185-195-240-250-250-250-250 | 200 | 9 | 49.4 | Uniform | 1% |
| 1F | 185-195-230-230-230-230-230 | 200 | 23 | 18.2 | Not Uniform | 1% |
| 1G | 185-195-250-260-260-260-260 | 200 | 9 | 20.5 | Not Uniform | 1% |
| 2A* | 220-230-240-250-250-250-250 | 180 | — | 0 | — | — |
| 2B | 220-230-240-250-250-250-250 | 180 | 23 | 22.3% | Uniform | 1% |
| 3A* | 260-270-280-290-295-295-295 | 180 | — | 0 | — | — |
| 3B | 260-270-280-290-295-295-295 | 180 | 46 | 22.6% | Uniform | 1% |

*Denotes Comparative Example.

Figure 2:
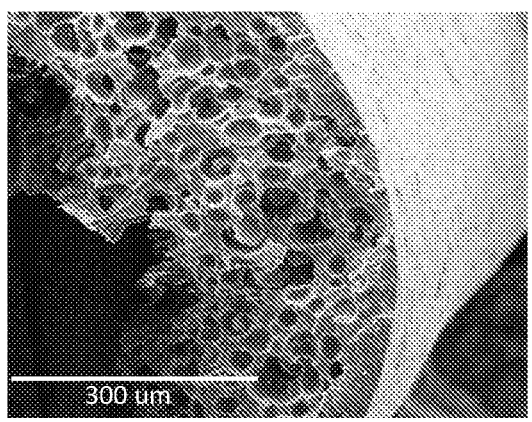
FIG. 2 shows a scanning electron microscope (SEM) image of a cross section of a foamed material according to Example 1D.
Figure 3:
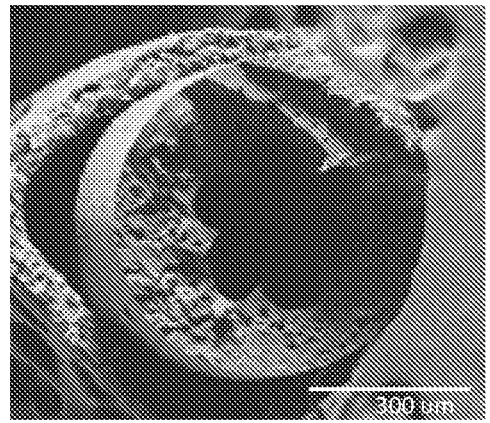
FIG. 3 shows a SEM image of a cross section of a foamed material according to Example 1F.

As shown in Table 4, the foamed thermoplastic materials of the present examples were prepared using various processing conditions. In particular, the extruder temperature profile and the distance of the exit die to the water bath were varied. The processing conditions selected were observed to affect the foam extent and the uniformity of the cell size for the resulting thermoplastic foams. For example, Examples 1B-E exhibited foaming extents of 27.6 to 51.4% and uniform cell size, where "uniform cell size" refers to foams having similar average cell sizes distributed uniformly throughout the foam, whereas Examples 1F-G exhibited lower foaming extents of 18.2-20.5% and less uniform cell size. The uniformity of cell size was analyzed using scanning electron microscopy (SEM) images obtained from a JEOL SEM using an operating voltage of 10 kV. An exemplary SEM image of a foamed material having uniform cells is shown in FIG. 2, which shows a SEM image of a cross section of a foamed material according to Example 1D. A SEM image of a foamed material which did not result in uniform cell size (FIG. 1F) is shown in FIG. 3.

Thus, the desired foam structure is generally produced using as high of a foam extent as possible. In general, a higher foam extent having a higher void percentage is preferred to reduce the dielectric constant. However, mechanical properties, including tensile elongation and tensile strength, tend to decrease as the extent of foaming is increased. Foams having small cells and an even cell size distribution can also be preferred.

The invention includes at least the following embodiments.

Embodiment 1

A foamed thermoplastic material comprising: a thermoplastic material exhibiting, in its unfoamed state, a flammability index of 0.1 to 15, determined according to ASTM D7309 Method A at a heating rate of 1° C. per second under nitrogen from 25 to 750° C.; a flame growth rate of 0.1 to 1.5 kW/m²s, determined according to ASTM E1354 or ISO 5660 using an applied heat flux of 35 kilowatt per square meter; a specific extinction area of 300 to 1200 square meters per kilogram, determined according to ASTM E1354 or ISO 5660 using an applied heat flux of 35 kilowatt per square meter; a tensile elongation of greater than 100%, measured according to UL 1581 at a temperature of 23° C., using a coated wire test sample; and a dielectric constant of 2 to 4, determined according to ASTM D150-11 at 1 MHz; and in its foamed state, a tensile elongation of 100 to 500%, measured according to UL 1581 at a temperature of 23° C., using a coated wire test sample; and a dielectric constant of 1.4 to 4, determined according to ASTM D150-11 at 1 MHz; and a plurality of cells having a number average mean diameter of 5 to 150 micrometers; wherein the cells are present in an amount effective to provide the foamed thermoplastic material with a density that is 10 to 90 percent of the density of the unfoamed thermoplastic material.

Embodiment 2

The foamed thermoplastic material of embodiment 1, wherein the thermoplastic material comprises a thermoplastic polymer selected from the group consisting of a poly (phenylene ether) and a polysulfone.

Embodiment 3

The foamed thermoplastic material of embodiment 2, comprising the polysulfone; wherein the polysulfone comprises repeating units of formula (I)

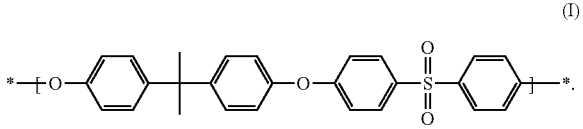

Embodiment 4

The foamed thermoplastic material of embodiment 1 or 2, comprising, 25 to 40 parts by weight of a poly(2,6-dimethyl-1,4-phenylene ether) having an intrinsic viscosity of 0.3 to 0.6 deciliters per gram; 30 to 45 parts by weight of an impact modifier comprising a first hydrogenated block copolymer of an alkenyl aromatic monomer and a conjugated diene having a poly(alkenyl aromatic) content of 30 to 50 weight percent and a melt flow index of 5 to 10 grams per 10 minutes, measured at 260° C. and 5 kilogram load according to ASTM D1238; and a second hydrogenated block copolymer of an alkenyl aromatic monomer and a conjugated diene having a poly(alkenyl aromatic) content of 20 to 40 weight percent and a melt flow index of 2 to 8 grams per 10 minutes, measured at 230° C. and 5 kilogram load according to ASTM D1238; 10 to 20 parts by weight of a polyolefin comprising a polybutene, a propylene homopolymer, or a combination thereof; and 10 to 15 parts by weight of a flame retardant comprising a phosphoric acid salt and a metal dialkyl phosphinate; wherein parts by weight are based on 100 parts by weight total of poly(phenylene ether), hydrogenated block copolymer, polyolefin, and flame retardant.

Embodiment 5

The foamed thermoplastic material of embodiment 1 or 2, wherein the thermoplastic material comprises, 45 to 55 parts by weight of a poly(2,6-dimethyl-1,4-phenylene ether) having an intrinsic viscosity of 0.3 to 0.6 deciliters per gram; 10 to 20 parts by weight of an impact modifier comprising a first hydrogenated block copolymer of an alkenyl aromatic monomer and a conjugated diene having a poly(alkenyl aromatic) content of 25 to 35 weight percent and a melt flow index of less than 1 gram per 10 minutes, measured at 230° C. and 5 kilogram load according to ASTM D1238; and a second hydrogenated block copolymer of an alkenyl aromatic monomer and a conjugated diene having a poly(alkenyl aromatic) content of 60 to 70 weight percent; 25 to 35 parts by weight of a propylene homopolymer; and 5 to 15 parts by weight of an organophosphate flame retardant; wherein parts by weight are based on 100 parts by weight total of poly(phenylene ether), hydrogenated block copolymer, polyolefin, and flame retardant.

Embodiment 6

The foamed thermoplastic material of embodiment 1 or 2, wherein the thermoplastic material comprises, 20 to 30 parts by weight of a poly(phenylene ether-siloxane) copolymer; 10 to 15 parts by weight of an impact modifier comprising a first hydrogenated block copolymer of an alkenyl aromatic monomer and a conjugated diene having a poly(alkenyl aromatic) content of 25 to 35 weight percent; and a second hydrogenated block copolymer of an alkenyl aromatic monomer and a conjugated diene having a poly(alkenyl aromatic) content of 25 to 35 weight percent and a melt flow index of less than 1 gram per 10 minutes, measured at 230° C. and 5 kilogram load according to ASTM D1238; 30 to 35 parts by weight of a polyolefin comprising a polybutene, a propylene homopolymer, an ethylene copolymer, or a combination thereof; 25 to 35 parts by weight of a surface-treated metal hydroxide; wherein parts by weight are based on 100 parts by weight total of poly(phenylene ether), hydrogenated block copolymer, polyolefin, and flame retardant.

Embodiment 7

The foamed thermoplastic material of any one of embodiments 1 to 6, wherein the foamed thermoplastic material exhibits a foaming extent of 5 to 80%.

Embodiment 8

A process of forming a foamed thermoplastic material, the process comprising, melt-kneading an unfoamed thermoplastic material exhibiting, a flammability index of 0.1 to 15, determined according to ASTM D7309 Method A at a heating rate of 1° C. per second under nitrogen from 25 to 750° C.; a flame growth rate of 0.1 to 1.5 kW/m²s, determined according to ASTM E1354 or ISO 5660 using an applied heat flux of 35 kilowatt per square meter; a specific extinction area of 300 to 1200 square meters per kilogram, determined according to ASTM E1354 or ISO 5660 using an applied heat flux of 35 kilowatt per square meter; a tensile elongation of greater than 100%, measured according to UL 1581 at a temperature of 23° C., using a coated wire test sample; and a dielectric constant of 2 to 4, determined according to ASTM D150-11 at 1 MHz; and a carbon dioxide-generating blowing agent under conditions effective to provide a foamed thermoplastic material, wherein the foamed thermoplastic material comprises a plurality of cells having a number average mean diameter of 5 to 150 micrometers, wherein the cells are present in an amount effective to provide a foamed material with a density that is 10 to 90 percent of the density of the unfoamed thermoplastic material, wherein the foamed thermoplastic material exhibits a tensile elongation of 100 to 500%, measured according to UL 1581 at a temperature of 23° C., using a coated wire test sample; and a dielectric constant of 1.4 to 4, determined according to ASTM D150-11 at 1 MHz.

Embodiment 9

The process of embodiment 8, wherein the thermoplastic material comprises a thermoplastic polymer selected from the group consisting of a poly(phenylene ether) and a polysulfone.

Embodiment 10

The process of embodiment 8 or 9, wherein the thermoplastic material comprises a polysulfone having repeating units of formula (I)

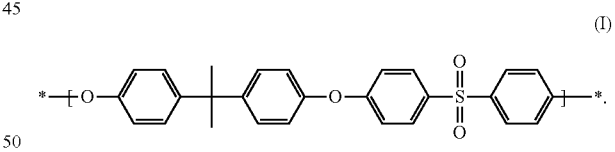

Embodiment 11

The process of embodiment 8 or 9, wherein the thermoplastic material comprises 25 to 40 parts by weight of a poly(2,6-dimethyl-1,4-phenylene ether) having an intrinsic viscosity of 0.3 to 0.6 deciliters per gram; 30 to 45 parts by weight of an impact modifier comprising a first hydrogenated block copolymer of an alkenyl aromatic monomer and a conjugated diene having a poly(alkenyl aromatic) content of 30 to 50 weight percent and a melt flow index of 5 to 10 grams per 10 minutes, measured at 260° C. and 5 kilogram load according to ASTM D1238; and a second hydrogenated block copolymer of an alkenyl aromatic monomer and a conjugated diene having a poly(alkenyl aromatic) content of 20 to 40 weight percent and a melt flow index of 2 to 8 grams per 10 minutes, measured at 230° C. and 5 kilogram load according to ASTM D1238; 10 to 20 parts by weight of a polyolefin comprising a polybutene, a propylene homopolymer, or a combination thereof; and 10 to 15 parts by weight of a flame retardant comprising a phosphoric acid salt and a metal dialkyl phosphinate; wherein parts by weight are based on 100 parts by weight total of poly(phenylene ether), hydrogenated block copolymer, polyolefin, and flame retardant.

Embodiment 12

The process of embodiment 8 or 9, wherein the thermoplastic material comprises, 45 to 55 parts by weight of a poly(2,6-dimethyl-1,4-phenylene ether) having an intrinsic viscosity of 0.3 to 0.6 deciliters per gram; 10 to 20 parts by weight of an impact modifier comprising a first hydrogenated block copolymer of an alkenyl aromatic monomer and a conjugated diene having a poly(alkenyl aromatic) content of 25 to 35 weight percent and a melt flow index of less than 1 gram per 10 minutes, measured at 230° C. and 5 kilogram load according to ASTM D1238; and a second hydrogenated block copolymer of an alkenyl aromatic monomer and a conjugated diene having a poly(alkenyl aromatic) content of 60 to 70 weight percent; 25 to 35 parts by weight of a propylene homopolymer; and 5 to 15 parts by weight of an organophosphate flame retardant; 25 to 35 parts by weight of a propylene homopolymer; and 5 to 15 parts by weight of an organophosphate flame retardant; wherein parts by weight are based on 100 parts by weight total of poly(phenylene ether), hydrogenated block copolymer, polyolefin, and flame retardant.

Embodiment 13

The process of embodiment 8 or 9, wherein the thermoplastic material comprises, 20 to 30 parts by weight of a poly(phenylene ether-siloxane) copolymer; 10 to 15 parts by weight of an impact modifier comprising a first hydrogenated block copolymer of an alkenyl aromatic monomer and a conjugated diene having a poly(alkenyl aromatic) content of 25 to 35 weight percent; and a second hydrogenated block copolymer of an alkenyl aromatic monomer and a conjugated diene having a poly(alkenyl aromatic) content of 25 to 35 weight percent and a melt flow index of less than 1 gram per 10 minutes, measured at 230° C. and 5 kilogram load according to ASTM D1238; 30 to 35 parts by weight of a polyolefin comprising a polybutene, a propylene homopolymer, an ethylene copolymer, or a combination thereof; and 25 to 35 parts by weight of a surface-treated metal hydroxide; wherein parts by weight are based on 100 parts by weight total of poly(phenylene ether), hydrogenated block copolymer, polyolefin, and flame retardant.

Embodiment 14

The process of any one of embodiments 8 to 13, wherein the carbon dioxide-generating blowing agent is a chemical blowing agent.

Embodiment 15

The process of any one of embodiments 8 to 14, wherein the carbon dioxide-generating blowing agent is present in an amount of 0.1 to 5 weight percent, based on the total weight of the chemical blowing agent and the unfoamed thermoplastic material.

Embodiment 16

The process of any one of embodiment 15, wherein the carbon dioxide-generating chemical blowing agent comprises sodium bicarbonate.

Embodiment 17

The process of any one of embodiment 15 or 16, wherein the carbon dioxide-generating chemical blowing agent has a decomposition temperature of 150 to 250° C.

Embodiment 18

The process of any one of embodiments 8 to 17, wherein the composition is melt-kneaded at a maximum temperature of 220 to 280° C.

Embodiment 19

A foamed thermoplastic material prepared by the process of any one of embodiments 8 to 18.

Embodiment 20

An article comprising the foamed thermoplastic material of any one of embodiments 1 to 7 or 19.

Embodiment 21

The article of embodiment 20, wherein the article is a plenum cable comprising a core comprising a transmission medium, wherein the transmission medium is enclosed by a primary insulation formed from the foamed thermoplastic material of any one of claim 1 to 7 or 19.

Embodiment 22

A process of coating a conductor wire, the process comprising, preheating the conductor wire to a temperature of 150 to 220° C.; contacting the preheated conductor wire with an unfoamed thermoplastic material exhibiting, a flammability index of 0.1 to 15, determined according to ASTM D7309 Method A at a heating rate of 1° C. per second under nitrogen from 25 to 750° C.; a flame growth rate of 0.1 to 1.5 kW/m$^2$s, determined according to ASTM E1354 or ISO 5660 using an applied heat flux of 35 kilowatt per square meter; a specific extinction area of 300 to 1200 square meters per kilogram, determined according to ASTM E1354 or ISO 5660 using an applied heat flux of 35 kilowatt per square meter; a tensile elongation of greater than 100%, measured according to UL 1581 at a temperature of 23° C., using a coated wire test sample; and a dielectric constant of 2 to 4, determined according to ASTM D150-11 at 1 MHz; and a carbon dioxide-generating blowing agent under conditions effective to provide a foamed thermoplastic material substantially surrounding the conductor wire and having a plurality of cells having a number average mean diameter of 5 to 150 micrometers, wherein the cells are present in an amount effective to provide a foamed material with a density that is 10 to 90 percent of the density of the unfoamed thermoplastic material; and wherein the foamed thermoplastic material exhibits a tensile elongation of 100 to 500%, measured according to UL 1581 at a temperature of 23° C., using a coated wire test sample; and a dielectric constant of 1.4 to 4, determined according to ASTM D150-11 at 1 MHz.

Embodiment 23

The process of embodiment 22, wherein the contacting is in an extruder having a feed zone temperature of 180 to 200° C. and an exit die temperature of 220 to 280° C.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other. Each range disclosed herein constitutes a disclosure of any point or sub-range lying within the disclosed range.

The invention claimed is:

1. A foamed thermoplastic material comprising:
a thermoplastic material comprising
25 to 40 parts by weight of a poly(2,6-dimethyl-1,4-phenylene ether) having an intrinsic viscosity of 0.3 to 0.6 deciliters per gram measured by Ubbelohde viscometer at 25° C. in chloroform;
30 to 45 parts by weight of an impact modifier comprising
a first hydrogenated block copolymer of an alkenyl aromatic monomer and a conjugated diene having a poly(alkenyl aromatic) content of 30 to 50 weight percent and a melt flow index of 5 to 10 grams per 10 minutes, measured at 260° C. and 5 kilogram load according to ASTM D1238; and
a second hydrogenated block copolymer of an alkenyl aromatic monomer and a conjugated diene having a poly(alkenyl aromatic) content of 20 to 40 weight percent and a melt flow index of 2 to 8 grams per 10 minutes, measured at 230° C. and 5 kilogram load according to ASTM D1238;
10 to 20 parts by weight of a polyolefin comprising a polybutene, a propylene homopolymer, or a combination thereof; and
10 to 15 parts by weight of a flame retardant comprising a phosphoric acid salt and a metal dialkyl phosphinate;
wherein parts by weight are based on 100 parts by weight total of poly(phenylene ether), hydrogenated block copolymer, polyolefin, and flame retardant;
or
45 to 55 parts by weight of a poly(2,6-dimethyl-1,4-phenylene ether) having an intrinsic viscosity of 0.3 to 0.6 deciliters per gram measured by Ubbelohde viscometer at 25° C. in chloroform;
10 to 20 parts by weight of an impact modifier comprising
a first hydrogenated block copolymer of an alkenyl aromatic monomer and a conjugated diene having a poly(alkenyl aromatic) content of 25 to 35 weight percent and a melt flow index of less than 1 gram per 10 minutes, measured at 230° C. and 5 kilogram load according to ASTM D1238; and
a second hydrogenated block copolymer of an alkenyl aromatic monomer and a conjugated diene having a poly(alkenyl aromatic) content of 60 to 70 weight percent;
25 to 35 parts by weight of a propylene homopolymer; and
5 to 15 parts by weight of an organophosphate flame retardant;
wherein parts by weight are based on 100 parts by weight total of poly(phenylene ether), hydrogenated block copolymer, polyolefin, and flame retardant;
or
20 to 30 parts by weight of a reaction product comprising a poly(phenylene ether-siloxane) copolymer and a poly(phenylene ether), wherein the reaction product is prepared by a process comprising oxidatively copolymerizing a monomer mixture comprising a monohydric phenol and a hydroxyaryl-terminated polysiloxane;
10 to 15 parts by weight of an impact modifier comprising
a first hydrogenated block copolymer of an alkenyl aromatic monomer and a conjugated diene having a poly(alkenyl aromatic) content of 25 to 35 weight percent; and
a second hydrogenated block copolymer of an alkenyl aromatic monomer and a conjugated diene having a poly(alkenyl aromatic) content of 25 to 35 weight percent and a melt flow index of less than 1 gram per 10 minutes, measured at 230° C. and 5 kilogram load according to ASTM D1238;
30 to 35 parts by weight of a polyolefin comprising a polybutene, a propylene homopolymer, an ethylene copolymer, or a combination thereof;
25 to 35 parts by weight of a surface-treated metal hydroxide;
wherein parts by weight are based on 100 parts by weight total of the reaction product, hydrogenated block copolymer, polyolefin, and flame retardant;
wherein the thermoplastic material exhibits,
in its unfoamed state,
a flammability index of 0.1 to 15, determined according to ASTM D7309 Method A at a heating rate of 1° C. per second under nitrogen from 25 to 750° C.;
a flame growth rate of 0.1 to 1.5 kW/m²s, determined according to ASTM E1354 or ISO 5660 using an applied heat flux of 35 kilowatt per square meter;
a specific extinction area of 300 to 1200 square meters per kilogram, determined according to ASTM E1354 or ISO 5660 using an applied heat flux of 35 kilowatt per square meter;
a tensile elongation of greater than 100%, measured according to UL 1581 at a temperature of 23° C., using a coated wire test sample; and
a dielectric constant of 2 to 4, determined according to ASTM D150-11 at 1 MHz; and
in its foamed state,
a tensile elongation of 100 to 500%, measured according to UL 1581 at a temperature of 23° C., using a coated wire test sample; and
a dielectric constant of 1.4 to 4, determined according to ASTM D150-11 at 1 MHz; and
a plurality of cells having a number average mean diameter of 5 to 150 micrometers, as determined by scanning electron microscopy;
wherein the cells are present in an amount effective to provide the foamed thermoplastic material with a density that is 10 to 90 percent of the density of the unfoamed thermoplastic material.

2. The foamed thermoplastic material of claim 1, comprising,
- 25 to 40 parts by weight of a poly(2,6-dimethyl-1,4-phenylene ether) having an intrinsic viscosity of 0.3 to 0.6 deciliters per gram measured by Ubbelohde viscometer at 25° C. in chloroform;
- 30 to 45 parts by weight of an impact modifier comprising
  - a first hydrogenated block copolymer of an alkenyl aromatic monomer and a conjugated diene having a poly(alkenyl aromatic) content of 30 to 50 weight percent and a melt flow index of 5 to 10 grams per 10 minutes, measured at 260° C. and 5 kilogram load according to ASTM D1238; and
  - a second hydrogenated block copolymer of an alkenyl aromatic monomer and a conjugated diene having a poly(alkenyl aromatic) content of 20 to 40 weight percent and a melt flow index of 2 to 8 grams per 10 minutes, measured at 230° C. and 5 kilogram load according to ASTM D1238;
- 10 to 20 parts by weight of a polyolefin comprising a polybutene, a propylene homopolymer, or a combination thereof; and
- 10 to 15 parts by weight of a flame retardant comprising a phosphoric acid salt and a metal dialkyl phosphinate;
- wherein parts by weight are based on 100 parts by weight total of poly(phenylene ether), hydrogenated block copolymer, polyolefin, and flame retardant.

3. The foamed thermoplastic material of claim 1, wherein the thermoplastic material comprises,
- 45 to 55 parts by weight of a poly(2,6-dimethyl-1,4-phenylene ether) having an intrinsic viscosity of 0.3 to 0.6 deciliters per gram measured by Ubbelohde viscometer at 25° C. in chloroform;
- 10 to 20 parts by weight of an impact modifier comprising
  - a first hydrogenated block copolymer of an alkenyl aromatic monomer and a conjugated diene having a poly(alkenyl aromatic) content of 25 to 35 weight percent and a melt flow index of less than 1 gram per 10 minutes, measured at 230° C. and 5 kilogram load according to ASTM D1238; and
  - a second hydrogenated block copolymer of an alkenyl aromatic monomer and a conjugated diene having a poly(alkenyl aromatic) content of 60 to 70 weight percent;
- 25 to 35 parts by weight of a propylene homopolymer; and
- 5 to 15 parts by weight of an organophosphate flame retardant;
- wherein parts by weight are based on 100 parts by weight total of poly(phenylene ether), hydrogenated block copolymer, polyolefin, and flame retardant.

4. The foamed thermoplastic material of claim 1, wherein the thermoplastic material comprises,
- 20 to 30 parts by weight of a reaction product comprising a poly(phenylene ether-siloxane) copolymer and a poly(phenylene ether), wherein the reaction product is prepared by a process comprising oxidatively copolymerizing a monomer mixture comprising a monohydric phenol and a hydroxyaryl-terminated polysiloxane;
- 10 to 15 parts by weight of an impact modifier comprising
  - a first hydrogenated block copolymer of an alkenyl aromatic monomer and a conjugated diene having a poly(alkenyl aromatic) content of 25 to 35 weight percent and a melt flow index of less than 1 gram per 10 minutes, measured at 230° C. and 5 kilogram load according to ASTM D1238;
- 30 to 35 parts by weight of a polyolefin comprising a polybutene, a propylene homopolymer, an ethylene copolymer, or a combination thereof;
- 25 to 35 parts by weight of a surface-treated metal hydroxide;
- wherein parts by weight are based on 100 parts by weight total of the reaction product, hydrogenated block copolymer, polyolefin, and flame retardant.

5. The foamed thermoplastic material of claim 1, wherein the foamed thermoplastic material exhibits a foaming extent of 5 to 80%.

6. A process of forming a foamed thermoplastic material, the process comprising,
melt-kneading
an unfoamed thermoplastic material comprising
- 25 to 40 parts by weight of a poly(2,6-dimethyl-1,4-phenylene ether) having an intrinsic viscosity of 0.3 to 0.6 deciliters per gram measured by Ubbelohde viscometer at 25'C in chloroform;
- 30 to 45 parts by weight of an impact modifier comprising
  - a first hydrogenated block copolymer of an alkenyl aromatic monomer and a conjugated diene having a poly(alkenyl aromatic) content of 30 to 50 weight percent and a melt flow index of 5 to 10 grams per 10 minutes, measured at 260° C. and 5 kilogram load according to ASTM D1238; and
  - a second hydrogenated block copolymer of an alkenyl aromatic monomer and a conjugated diene having a poly(alkenyl aromatic) content of 20 to 40 weight percent and a melt flow index of 2 to 8 grams per 10 minutes, measured at 230° C. and 5 kilogram load according to ASTM D1238;
- 10 to 20 parts by weight of a polyolefin comprising a polybutene, a propylene homopolymer, or a combination thereof; and
- 10 to 15 parts by weight of a flame retardant comprising a phosphoric acid salt and a metal dialkyl phosphinate;
- wherein parts by weight are based on 100 parts by weight total of poly(phenylene ether), hydrogenated block copolymer, polyolefin, and flame retardant;

or

- 45 to 55 parts by weight of a poly(2,6-dimethyl-1,4-phenylene ether) having an intrinsic viscosity of 0.3 to 0.6 deciliters per gram measured by Ubbelohde viscometer at 25° C. in chloroform;
- 10 to 20 parts by weight of an impact modifier comprising
  - a first hydrogenated block copolymer of an alkenyl aromatic monomer and a conjugated diene having a poly(alkenyl aromatic) content of 25 to 35 weight percent and a melt flow index of less than 1 gram per 10 minutes, measured at 230° C. and 5 kilogram load according to ASTM D1238; and
  - a second hydrogenated block copolymer of an alkenyl aromatic monomer and a conjugated diene having a poly(alkenyl aromatic) content of 60 to 70 weight percent;
- 25 to 35 parts by weight of a propylene homopolymer; and
- 5 to 15 parts by weight of an organophosphate flame retardant;

wherein parts by weight are based on 100 parts by weight total of poly(phenylene ether), hydrogenated block copolymer, polyolefin, and flame retardant;
or
20 to 30 parts by weight of a reaction product comprising a poly(phenylene ether-siloxane) copolymer and a poly(phenylene ether), wherein the reaction product is prepared by a process comprising oxidatively copolymerizing a monomer mixture comprising a monohydric phenol and a hydroxyaryl-terminated polysiloxane;
10 to 15 parts by weight of an impact modifier comprising
a first hydrogenated block copolymer of an alkenyl aromatic monomer and a conjugated diene having a poly(alkenyl aromatic) content of 25 to 35 weight percent; and
a second hydrogenated block copolymer of an alkenyl aromatic monomer and a conjugated diene having a poly(alkenyl aromatic) content of 25 to 35 weight percent and a melt flow index of less than 1 gram per 10 minutes, measured at 230° C. and 5 kilogram load according to ASTM D1238;
30 to 35 parts by weight of a polyolefin comprising a polybutene, a propylene homopolymer, an ethylene copolymer, or a combination thereof;
25 to 35 parts by weight of a surface-treated metal hydroxide;
wherein parts by weight are based on 100 parts by weight total of the reaction product, hydrogenated block copolymer, polyolefin, and flame retardant;
wherein the unfoamed thermoplastic material exhibits,
a flammability index of 0.1 to 15, determined according to ASTM D7309 Method A at a heating rate of 1° C. per second under nitrogen from 25 to 750° C.;
a flame growth rate of 0.1 to 1.5 kW/m²s, determined according to ASTM E1354 or ISO 5660 using an applied heat flux of 35 kilowatt per square meter;
a specific extinction area of 300 to 1200 square meters per kilogram, determined according to ASTM E1354 or ISO 5660 using an applied heat flux of 35 kilowatt per square meter;
a tensile elongation of greater than 100%, measured according to UL 1581 at a temperature of 23° C., using a coated wire test sample; and
a dielectric constant of 2 to 4, determined according to ASTM D150-11 at 1 MHz; and
a carbon dioxide-generating blowing agent under conditions effective to provide a foamed thermoplastic material, wherein the foamed thermoplastic material comprises a plurality of cells having a number average mean diameter of 5 to 150 micrometers determined by scanning electron microscopy, wherein the cells are present in an amount effective to provide a foamed material with a density that is 10 to 90 percent of the density of the unfoamed thermoplastic material, wherein the foamed thermoplastic material exhibits
a tensile elongation of 100 to 500%, measured according to UL 1581 at a temperature of 23° C., using a coated wire test sample; and
a dielectric constant of 1.4 to 4, determined according to ASTM D150-11 at 1 MHz.

7. The process of claim 6, wherein the thermoplastic material comprises
25 to 40 parts by weight of a poly(2,6-dimethyl-1,4-phenylene ether) having an intrinsic viscosity of 0.3 to 0.6 deciliters per gram measured by Ubbelohde viscometer at 25° C. in chloroform;
30 to 45 parts by weight of an impact modifier comprising
a first hydrogenated block copolymer of an alkenyl aromatic monomer and a conjugated diene having a poly(alkenyl aromatic) content of 30 to 50 weight percent and a melt flow index of 5 to 10 grams per 10 minutes, measured at 260° C. and 5 kilogram load according to ASTM D1238; and
a second hydrogenated block copolymer of an alkenyl aromatic monomer and a conjugated diene having a poly(alkenyl aromatic) content of 20 to 40 weight percent and a melt flow index of 2 to 8 grams per 10 minutes, measured at 230° C. and 5 kilogram load according to ASTM D1238;
10 to 20 parts by weight of a polyolefin comprising a polybutene, a propylene homopolymer, or a combination thereof; and
10 to 15 parts by weight of a flame retardant comprising a phosphoric acid salt and a metal dialkyl phosphinate;
wherein parts by weight are based on 100 parts by weight total of poly(phenylene ether), hydrogenated block copolymer, polyolefin, and flame retardant.

8. The process of claim 6, wherein the thermoplastic material comprises,
45 to 55 parts by weight of a poly(2,6-dimethyl-1,4-phenylene ether) having an intrinsic viscosity of 0.3 to 0.6 deciliters per gram measured by Ubbelohde viscometer at 25° C. in chloroform;
10 to 20 parts by weight of an impact modifier comprising
a first hydrogenated block copolymer of an alkenyl aromatic monomer and a conjugated diene having a poly(alkenyl aromatic) content of 25 to 35 weight percent and a melt flow index of less than 1 gram per 10 minutes, measured at 230° C. and 5 kilogram load according to ASTM D1238; and
a second hydrogenated block copolymer of an alkenyl aromatic monomer and a conjugated diene having a poly(alkenyl aromatic) content of 60 to 70 weight percent;
25 to 35 parts by weight of a propylene homopolymer; and
5 to 15 parts by weight of an organophosphate flame retardant;
wherein parts by weight are based on 100 parts by weight total of poly(phenylene ether), hydrogenated block copolymer, polyolefin, and flame retardant.

9. The process of claim 6, wherein the thermoplastic material comprises,
20 to 30 parts by weight of a reaction product comprising a poly(phenylene ether-siloxane) copolymer and a poly(phenylene ether), wherein the reaction product is prepared by a process comprising oxidatively copolymerizing a monomer mixture comprising a monohydric phenol and a hydroxyaryl-terminated polysiloxane;
10 to 15 parts by weight of an impact modifier comprising
a first hydrogenated block copolymer of an alkenyl aromatic monomer and a conjugated diene having a poly(alkenyl aromatic) content of 25 to 35 weight percent; and
a second hydrogenated block copolymer of an alkenyl aromatic monomer and a conjugated diene having a poly(alkenyl aromatic) content of 25 to 35 weight percent and a melt flow index of less than 1 gram per 10 minutes, measured at 230° C. and 5 kilogram load according to ASTM D1238;

30 to 35 parts by weight of a polyolefin comprising a polybutene, a propylene homopolymer, an ethylene copolymer, or a combination thereof; and 25 to 35 parts by weight of a surface-treated metal hydroxide;

wherein parts by weight are based on 100 parts by weight total of the reaction product, hydrogenated block copolymer, polyolefin, and flame retardant.

10. The process of claim 6, wherein the carbon dioxide-generating blowing agent is present in an amount of 0.1 to 5 weight percent, based on the total weight of the blowing agent and the unfoamed thermoplastic material;

the carbon dioxide-generating blowing agent comprises sodium bicarbonate; and the carbon dioxide-generating blowing agent has a decomposition temperature of 150 to 250° C.

11. A foamed thermoplastic material prepared by the process of claim 6.

12. An article comprising the foamed thermoplastic material of claim 1.

13. The article of claim 12, wherein the article is a plenum cable comprising a core comprising a transmission medium, wherein the transmission medium is enclosed by a primary insulation formed from the foamed thermoplastic material of claim 1.

14. A process of coating a conductor wire, the process comprising, preheating the conductor wire to a temperature of 150 to 220° C.;

contacting the preheated conductor wire with an unfoamed thermoplastic material comprising 25 to 40 parts by weight of a poly(2,6-dimethyl-1,4-phenylene ether) having an intrinsic viscosity of 0.3 to 0.6 deciliters per gram measured by Ubbelohde viscometer at 25° C. in chloroform;

30 to 45 parts by weight of an impact modifier comprising a first hydrogenated block copolymer of an alkenyl aromatic monomer and a conjugated diene having a poly(alkenyl aromatic) content of 30 to 50 weight percent and a melt flow index of 5 to 10 grams per 10 minutes, measured at 260° C. and 5 kilogram load according to ASTM D1238; and a second hydrogenated block copolymer of an alkenyl aromatic monomer and a conjugated diene having a poly(alkenyl aromatic) content of 20 to 40 weight percent and a melt flow index of 2 to 8 grams per 10 minutes, measured at 230° C. and 5 kilogram load according to ASTM D1238;

10 to 20 parts by weight of a polyolefin comprising a polybutene, a propylene homopolymer, or a combination thereof; and 10 to 15 pans by weight of a flame retardant comprising a phosphoric acid salt and a metal dialkyl phosphinate;

wherein parts by weight are based on 100 parts by weight total of poly(phenylene ether), hydrogenated block copolymer, polyolefin, and flame retardant;

or 45 to 55 parts by weight of a poly(2,6-dimethyl-1,4-phenylene ether) having an intrinsic viscosity of 0.3 to 0.6 deciliters per gram measured by Ubbelohde viscometer at 25° C. in chloroform;

10 to 20 parts by weight of an impact modifier comprising a first hydrogenated block copolymer of an alkenyl aromatic monomer and a conjugated diene having a poly(alkenyl aromatic) content of 25 to 35 weight percent and a melt flow index of less than 1 gram per 10 minutes, measured at 230° C. and 5 kilogram load according to ASTM D1238; and a second hydrogenated block copolymer of an alkenyl aromatic monomer and a conjugated diene having a poly(alkenyl aromatic) content of 60 to 70 weight percent;

25 to 35 parts by weight of a propylene homopolymer; and 5 to 15 parts by weight of an organophosphate flame retardant;

wherein parts by weight are based on 100 parts by weight total of poly(phenylene ether), hydrogenated block copolymer, polyolefin, and flame retardant;

or 20 to 30 parts by weight of a reaction product comprising a poly(phenylene ether-siloxane) copolymer and a poly(phenylene ether), wherein the reaction product is prepared by a process comprising oxidatively copolymerizing a monomer mixture comprising a monohydric phenol and a hydroxyaryl-terminated polysiloxane;

10 to 15 parts by weight of an impact modifier comprising a first hydrogenated block copolymer of an alkenyl aromatic monomer and a conjugated diene having a poly(alkenyl aromatic) content of 25 to 35 weight percent; and a second hydrogenated block copolymer of an alkenyl aromatic monomer and a conjugated diene having a poly(alkenyl aromatic) content of 25 to 35 weight percent and a melt flow index of less than 1 gram per 10 minutes, measured at 230° C. and 5 kilogram load according to ASTM D1238;

30 to 35 parts by weight of a polyolefin comprising a polybutene, a propylene homopolymer, an ethylene copolymer, or a combination thereof;

25 to 35 parts by weight of a surface-treated metal hydroxide;

wherein parts by weight are based on 100 parts by weight total of the reaction product, hydrogenated block copolymer, polyolefin, and flame retardant;

wherein the unfoamed thermoplastic material exhibits, a flammability index of 0.1 to 15, determined according to ASTM D7309 Method A at a heating rate of 1° C. per second under nitrogen from 25 to 750° C.;

a flame growth rate of 0.1 to 1.5 kW/m$^2$s, determined according to ASTM E1354 or ISO 5660 using an applied heat flux of 35 kilowatt per square meter;

a specific extinction area of 300 to 1200 square meters per kilogram, determined according to ASTM E1354 or ISO 5660 using an applied heat flux of 35 kilowatt per square meter;

a tensile elongation of greater than 100%, measured according to UL 1581 at a temperature of 23° C., using a coated wire test sample; and a dielectric constant of 2 to 4, determined according to ASTM D150-11 at 1 MHz; and a carbon dioxide-generating blowing agent under conditions effective to provide a foamed thermoplastic material substantially surrounding the conductor wire and having a plurality of cells having a number average mean diameter of 5 to 150 micrometers determined by scanning electron microscopy, wherein the cells are present in an amount effective to provide a foamed material with a density that is 10 to 90 percent of the density of the unfoamed thermoplastic material; and wherein the foamed thermoplastic material exhibits
a tensile elongation of 100 to 500%, measured according to UL 1581 at a temperature of 23° C., using a coated wire test sample; and
a dielectric constant of 1.4 to 4, determined according to ASTM D150-11 at 1 MHz.

* * * * *